United States Patent [19]

Cole et al.

[11] Patent Number: 5,538,374
[45] Date of Patent: Jul. 23, 1996

[54] KEY DUPLICATING MACHINE AND METHOD

[75] Inventors: Stephan W. Cole, Moreland Hills; Eric R. Hammonds, Mantua; Anthony Nicholas; Richard Ryai, both of Cleveland; David J. Sot; Samuel J. Zelenak, both of Strongsville; Ronald B. Berringer, Akron, all of Ohio

[73] Assignee: American Consumer Products, Inc., Solon, Ohio

[21] Appl. No.: 289,860

[22] Filed: Aug. 12, 1994

[51] Int. Cl.$^6$ .................................................... B23C 3/35
[52] U.S. Cl. ............................. 409/132; 76/110; 409/83
[58] Field of Search ....................... 409/81, 83, 132; 76/110

[56]   References Cited

U.S. PATENT DOCUMENTS

| | | | |
|---|---|---|---|
| 3,138,999 | 6/1964 | Haggstrom | 409/83 |
| 3,442,174 | 5/1969 | Weiner et al. | 409/83 |
| 3,792,639 | 2/1974 | Richens | 409/83 |
| 3,956,968 | 5/1976 | Crasnianski | 409/83 |
| 3,978,764 | 9/1976 | Patriquin | 409/83 |
| 4,023,464 | 5/1977 | Zion . | |
| 4,354,780 | 10/1982 | Bougiouris | 409/122 |
| 5,167,171 | 12/1992 | Heredia | 76/110 |
| 5,259,708 | 11/1993 | Brice | 409/81 |
| 5,271,698 | 12/1993 | Heredia et al. | 409/82 |

Primary Examiner—Daniel W. Howell
Attorney, Agent, or Firm—Thompson Hine & Flory

[57]   ABSTRACT

A key duplicating machine which automatically liens the original and blank keys, clamping the keys in alignment with the appropriate clamping pressure, cuts double-sided keys in a single pass, prevents operation of the machine without the presence of the original and blank keys in the machine and which is capable of accepting virtually any type of key shape for duplication. The invention includes a single-sided key duplicating module having a motor driven cutter wheel which is slidably mounted on a travel table that, in turn, is slidably mounted on a base plate. The travel table includes a motor driven stacked cam assembly which engages fixed cam followers in the base plate, so when rotated, the cam assembly, travel table and cutter wheels are moved first in a cutting pass, then in a return pass with respect to the original and blank keys. The cam assembly also includes a cam follower which displaces the cutting wheel sidewardly away from the blank key on the return pass. The original and blank keys are pressed against alignment surfaces by springs prior to clamping, and the springs are displaced away from the keys to provide clearance for the cutter wheel during cutting.

25 Claims, 17 Drawing Sheets

SINGLE SIDED KEY MACHINE TIMING CHART

KEY DUPLICATING MACHINE AND METHOD

BACKGROUND

The present invention relates to key duplicating machines, and more particularly, to key duplicating machines which are capable of duplicating single and double-sided keys automatically.

The traditional key duplicating machine was designed to be used by a skilled operator and required many manual steps to complete the key duplication process. Such devices typically included a pair of thumbscrew clamps for clamping the original and blank keys, a gauge for aligning the original and blank keys by fixing the distance between the shoulders of the keys, and a sliding carriage which moved the clamped original and blank keys so that the original key engaged a fixed follower which corresponded to a fixed cutting wheel, so that the cutting wheel would cut a series of teeth in the blank key blade corresponding to the notches in the original.

Such devices permitted error in the alignment of the keys on the clamps, the spacing of keys apart from each other, and the skill of the operator in passing the original key against the follower and effecting a cut in the blank key. Consequently, keys made from such a duplication process possessed a relatively high failure rate.

Attempts have been made to automate such a process and thereby minimize the opportunity for operator error. Once such example is disclosed in Heredia et al. U.S. Pat. No. 5,271,698. That patent discloses a key duplicating machine purportedly capable of duplicating a double-sided key in a single operation, and which includes a pair of horizontally opposed, motor-driven cutter wheels, each mounted on a cutter block which is biased toward the key blank.

A disadvantage with such devices is it is necessary for the operator to force the cutting wheels apart when inserting the original and blank keys into the device; the biasing spring force must be overcome, which may result in misalignment of the key and wear on the cutting wheel. Further, it is necessary for that device to perform every cutting operation in two passes: a first pass away from the cutting machine, and a second pass on a return movement toward the front of the machine. Accordingly, the cutting time to duplicate a particular key is relatively great.

Accordingly, there is a need for a key duplicating machine which facilitates insertion and alignment of the original and blank keys, and which can perform a cutting operation in a single pass, in addition to being safe to operate, uniform in clamping pressure to enhance accuracy of gauging, and which is capable of accepting a wide variety of key shapes.

SUMMARY OF THE INVENTION

The present invention is a key duplicating machine and method which overcomes many of the infirmities of prior devices. More specifically, the key duplicating machine and method of the present invention automatically aligns the original and blank keys with respect to each other, applies correct clamping force to hold the keys in position during cutting, and cuts either a single or double-sided blank key. As a result, the accuracy of the duplicated key is greatly increased, resulting in fewer rejects. In addition, the key duplicating machine of the present invention is capable of cutting single or double-sided keys with a single pass of the cutting mechanism. Furthermore, in the preferred embodiment, which contains a single-sided key duplicating module and a double-sided module, single and double-sided keys may be cut simultaneously.

With respect to operator safety, the present invention presents several advancements over the prior art. For example, the cutting mechanism, which in the preferred embodiment comprises motor-driven cutting wheels, is totally enclosed within the machine housing, thereby containing the metal shavings and other debris generated during a key duplicating operation. In addition, the housing includes a chip removal drawer which is connected to a switch which disables the system in the event that the drawer is open. Further, the single and double-sided key duplicating modules do not operate unless both original and blank keys are inserted in both the modules.

In the preferred embodiment, the key duplicating machine includes a single-sided key duplicating module having a clamp block with spring-actuated clamping jaws. The clamping jaws are displaced from their clamping position by eccentric cams rotated by the operator, and alternatively the operator can pivot the cams to allow the springs associated with the clamping mechanisms to urge the jaws into a clamping. Accordingly, the clamping force exerted by the jaws on the original and blank keys is exerted by springs of present tension, as supposed to prior art devices in which the clamping force is exerted by the muscle force of the operator pivoting such camming elements. Consequently, there is a uniform clamping force applied to the keys regardless of variations in the strength of the operator. This results in more accurate positioning of the keys and reduces the likelihood of key movement during the cutting operation.

The single-sided duplicating module also includes a spring block having a leaf spring assembly which urges the original and blank keys against a guide surface and holds the keys in the desired orientation with respect to each other prior to clamping. In the preferred embodiment, this spring assembly engages the keys upon their insertion into the module by the operator. Accordingly, no operator action is required other than the insertion of the keys into appropriately shaped slots in the module, similar to inserting the keys in locks.

The single-sided module includes a stacked cam assembly which is mounted to a reciprocating travel bed which also supports a motor driven cutter wheel. When the single-sided module is activated, the cam assembly rotates, thereby displacing cam followers which move the spring rotated alignment assembly away from the original and blank keys, move the cutter wheel into engagement with the blank key and move the travel bed along the cutting and return passes.

The preferred embodiment also includes a double-sided key duplicating module having a pair of motor driven cutter wheels mounted on a travel bed for lateral movement toward and away from a double-sided key blank, the travel bed itself being mounted for longitudinal movement. A motor-driven cam, mounted on the travel bed, engages a stationery follower, and rotation of the cam causes the bed to move along a cutting path and a return path.

The cutter blocks are kept apart and away from the blank prior to cutting by a pair of spring-loaded shot blocks. When activated, the cutter wheels first move forwardly slightly, to clear the shot blocks, then proceed along a cutting path. At the point of travel where the cutter blocks pass the blank, the shot blocks are sprung back into position and keep the cutter wheels separated on the return travel so that they do not touch the key blank.

To place keys into the machine, keys are inserted into slots similar to inserting such keys into locks, and the tips of the keys engage spring-loaded tip gauges engage which guide the key blades and hold them in position prior to clamping. At the base of the key blades, laterally-moving, spring loaded jaws hold the keys in position prior to clamping.

The overall safety of the system is enhanced by providing switches which are normally closed, but open when the housing lid is open, or the chip drawer beneath the cutters is open. In addition, normally open switches are provided and positioned such that they are closed only when keys are inserted in both the original and blank key slots for both the single-sided and double-sided duplicating modules. These switches are connected to the motor circuit so the single-sided duplicating module will not operate unless keys are in both slots, and similarly, the double-sided duplicating module will not operate unless keys are in both of its slots. In the preferred embodiment, the power circuitry also includes counters which keep track the number of keys duplicated.

Accordingly, it is an object of the present invention to provide a new and improved key duplicating machine which is capable of duplicating both single-sided and double-sided keys and can do so simultaneously; a key duplicating machine in which the cutter wheels are totally enclosed to minimize chip spray; a key duplicating system which is fully automated and does not rely upon operator skill to position the original and blank keys, properly apply clamping force or perform actual blank key cutting operations; a key duplicating machine which is capable of accommodating virtually any size and shape key and key blank; a key duplicating machine which is capable of providing a double-sided key duplication with a single pass of the cutting elements; a key duplicating machine which includes sufficient circuit interlocks so that the system cannot be activated if the chip drawer is open, the housing lid is open, or if keys are not present in both the original and blank key slots; a key duplicating machine in which cams are used to provide precise positioning of cutter wheels and high precision movement of the cutter wheels along the cutting path; and a key duplicating machine which is easy to operate and possesses a high degree of reliability.

Other objects and advantages of the present invention will be apparent from the following description, the accompanying drawings and the appended claims.

DETAILED DESCRIPTION

Figure 1:
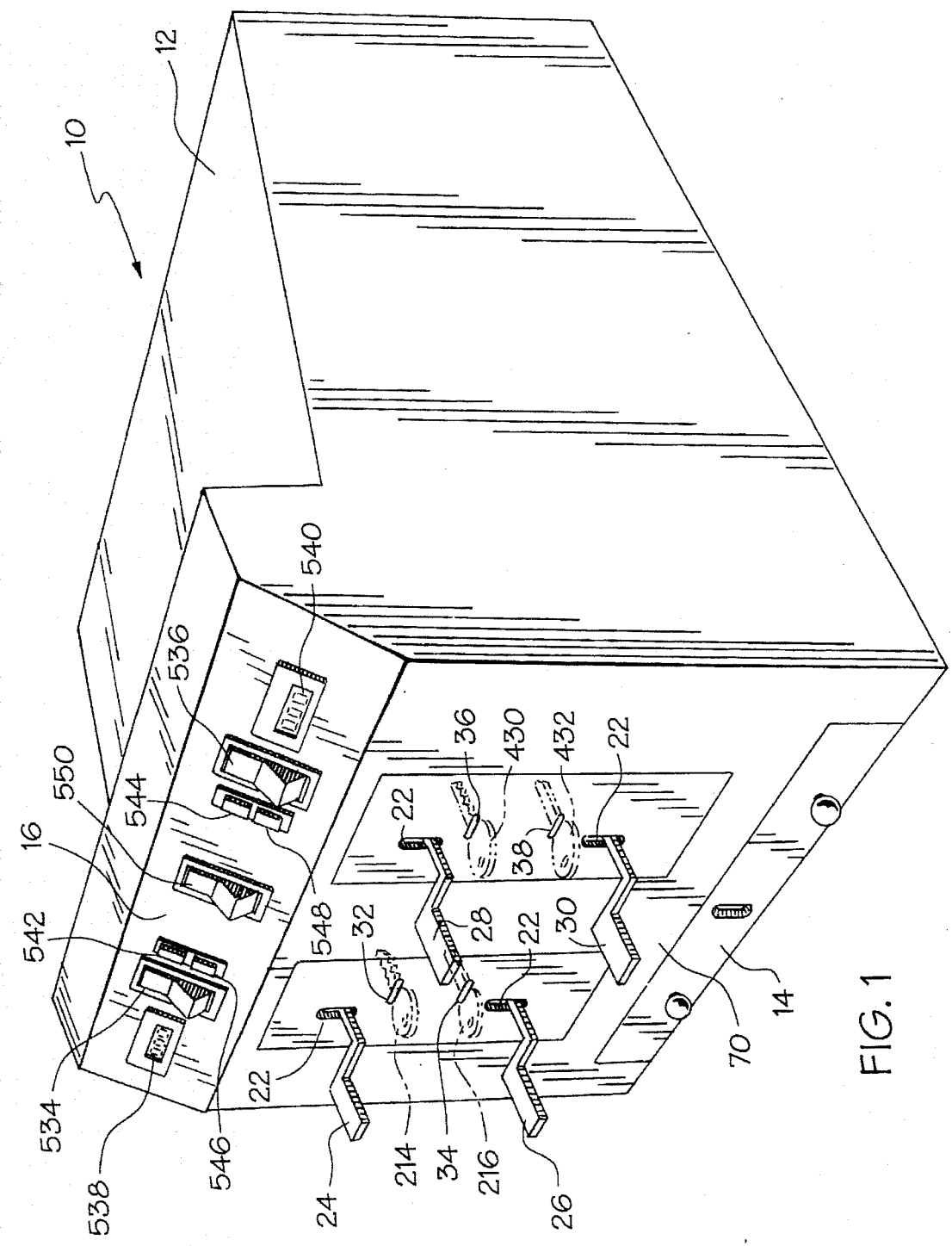
FIG. 1 is a perspective view of a preferred embodiment of the key duplicating machine of the present invention.
Figure 2:
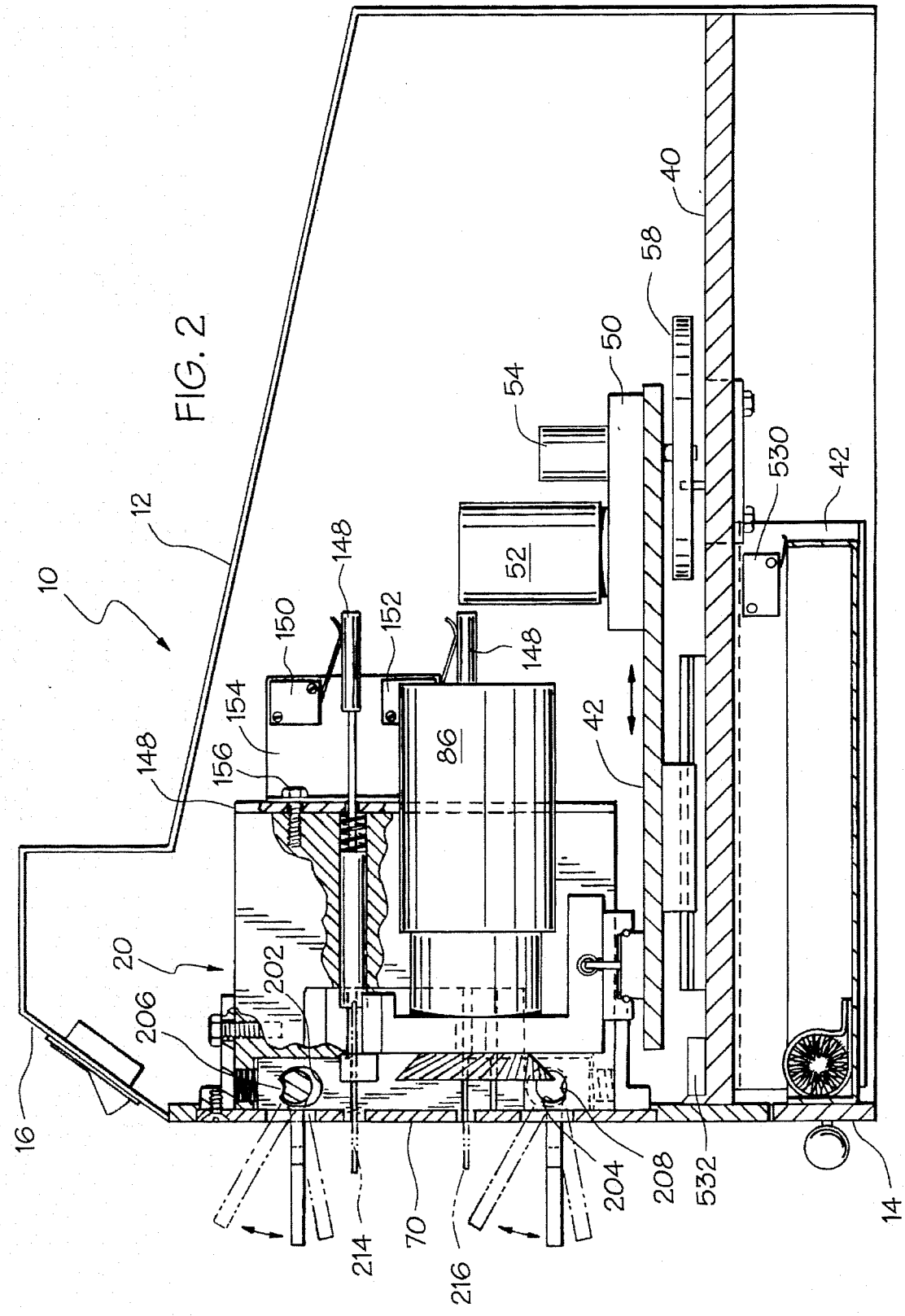
FIG. 2 is a side elevation in section of the machine of FIG. 1.
Figure 3:
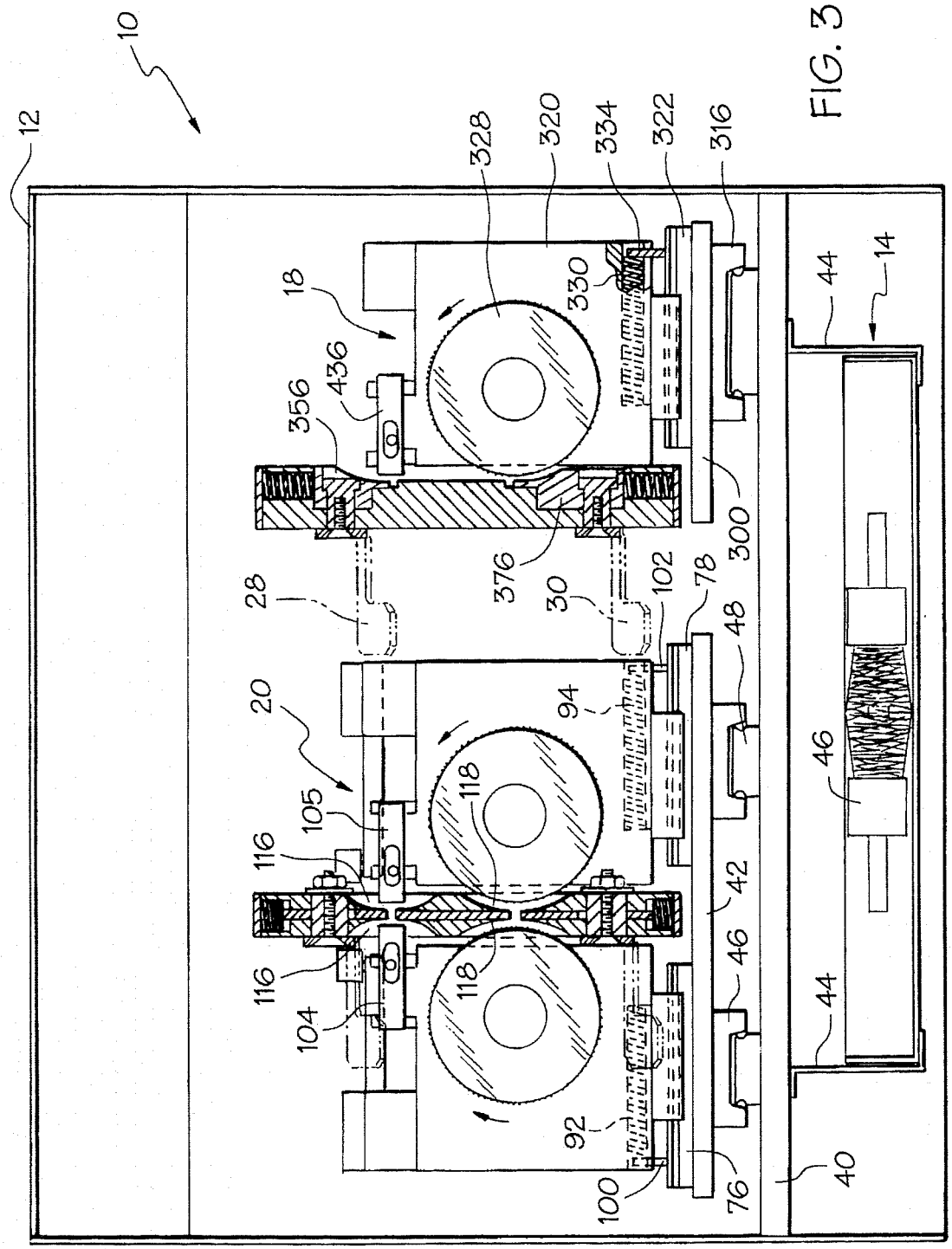
FIG. 3 is a front elevation of the machine of FIG. 1, showing the front cover removed to reveal the single-sided and double-sided duplicating modules and chip drawer.

As shown in FIG. 1, the preferred embodiment of the key duplicating machine of the present invention, generally designated 10, includes a housing 12 having a front-opening chip drawer 14 and control panel 16. As shown in FIGS. 2 and 3, the housing 12 encloses single-sided and double-sided key duplicating modules, generally designated 18, 20 respectively. The modules 18, 20 are totally enclosed by the housing 12, except for slots 22 through which the upper and lower clamping levers 24, 26, respectively of the double-sided module 20, and the upper and lower locking levers 28, 30, respectively, of the single-sided module 18 extend, and the slots 32, 34, 36, 38 through which the original and blank keys are inserted into the modules.

As shown in FIGS. 2 and 3, the single and double-sided duplicating modules 18, 20 are mounted on a fixed base plate 40 which is attached to the housing 12. The base plate 40 also includes brackets of 42, 44 which support the drawer 14. The drawer 14 includes a deburring brush 46.

Double-Sided Duplicating Module

Figure 14:
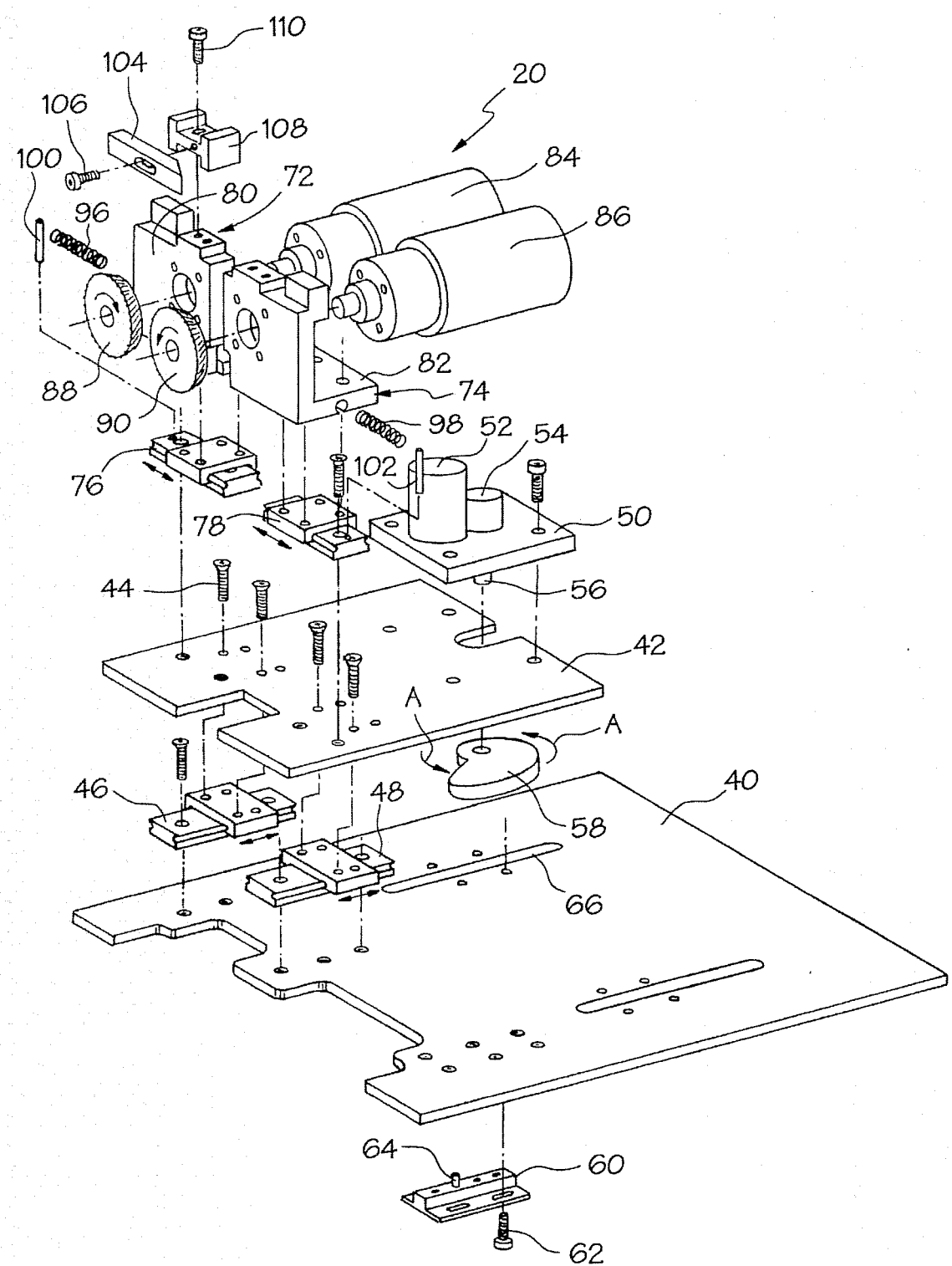
FIG. 14 is a detail showing an exploded, perspective view of the cutter assemblies of the double-sided duplicating module of the machine of FIG. 1.

The double-sided module 20 is shown in FIG. 14 and includes a travel bed or plate 42 which is mounted by screws 44 onto longitudinal slides 46, 48. The slides 46, 48 are, in turn, mounted on the base plate 40. The travel plate 42 includes a motor block 50 which supports a cam motor 52 and associated pinion 54 having an output shaft 56 that engages an eccentric cam 58, located beneath the travel table 42 and above the base plate 40. A cam follower block 60 is attached to the underside of the base plate 40 by screws 62 and includes a cam follower 64 which protrudes upwardly through a slot 66 in the base plate.

Figure 15:
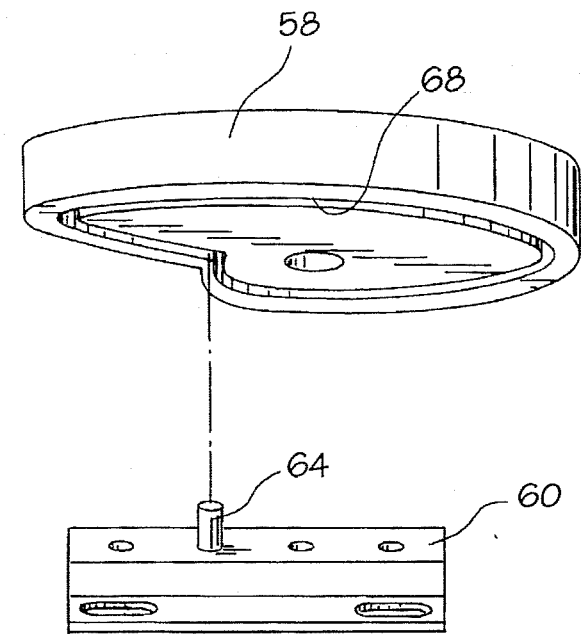
FIGS. 15 and 16 are details showing the cam and follower of the double-sided duplicating module of FIG. 1.
Figure 16:
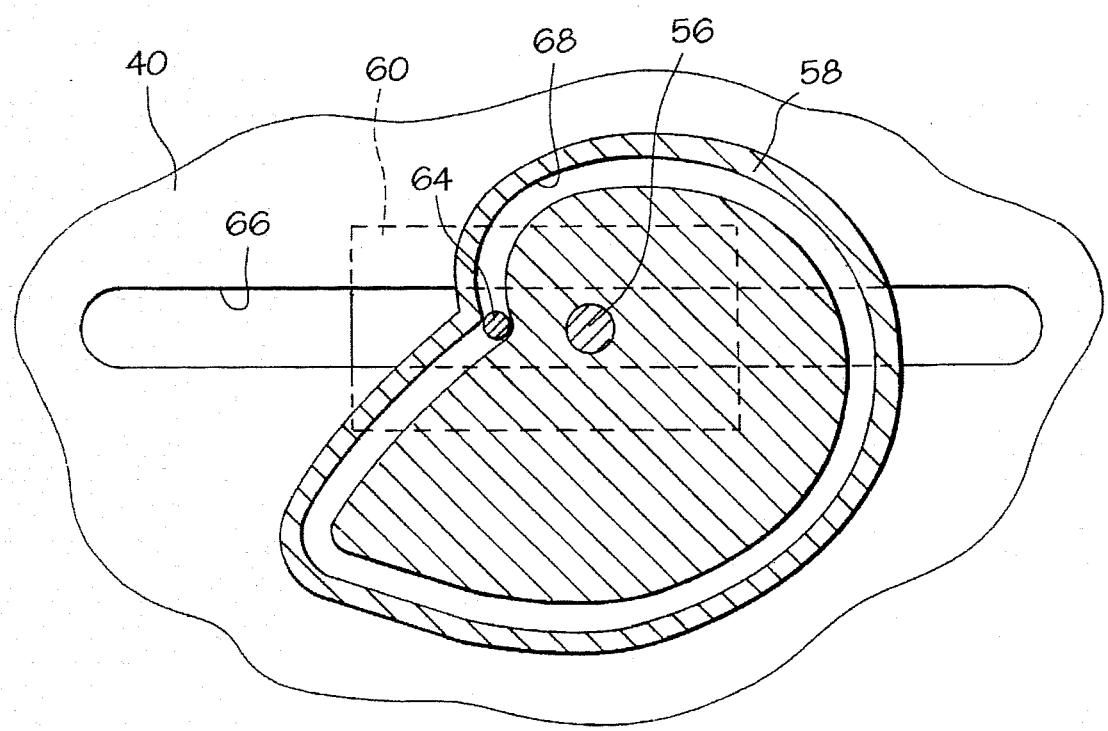

As shown in FIGS. 15 and 16, the cam follower 64 engages a slot 68 formed in the cam 58 which follows the contour of the eccentric cam. Consequently, when the motor 52 (FIG. 14) is actuated to rotate the output shaft 56, the cam 58 is rotated as indicated by arrows A in FIG. 14, causing the travel table 42 to reciprocate relative to base plate 40 toward and away from the front wall 70 of the housing 12 (see FIG. 2).

As shown in FIG. 14, the double-sided duplicating module 20 includes a pair of cutter wheel assemblies 72, 74, mounted on travel table 42 by lateral slides 76, 78, respectively. Assemblies 72, 74 include cutter blocks 80, 82 which support cutter wheel motors 84, 86 that drive cutter wheels 88, 90, respectively. Cutter blocks 80, 82 include bores 92, 94 (see FIG. 3) in which are mounted compression springs 96, 98 that are seated against pins 100, 102 in the slides 76, 78. Consequently, springs 96, 98 push against pins 100, 102 to urge the cutter block assemblies 72, 74 inwardly toward each other.

Cutter block assemblies 72, 74 each include a follower 104 (only one of which is shown) which is attached by a screw 106 to a follower mounting block 108 which, in turn, is attached to the tops of the cutter blocks 80, 82 by screws 110.

Figure 6:
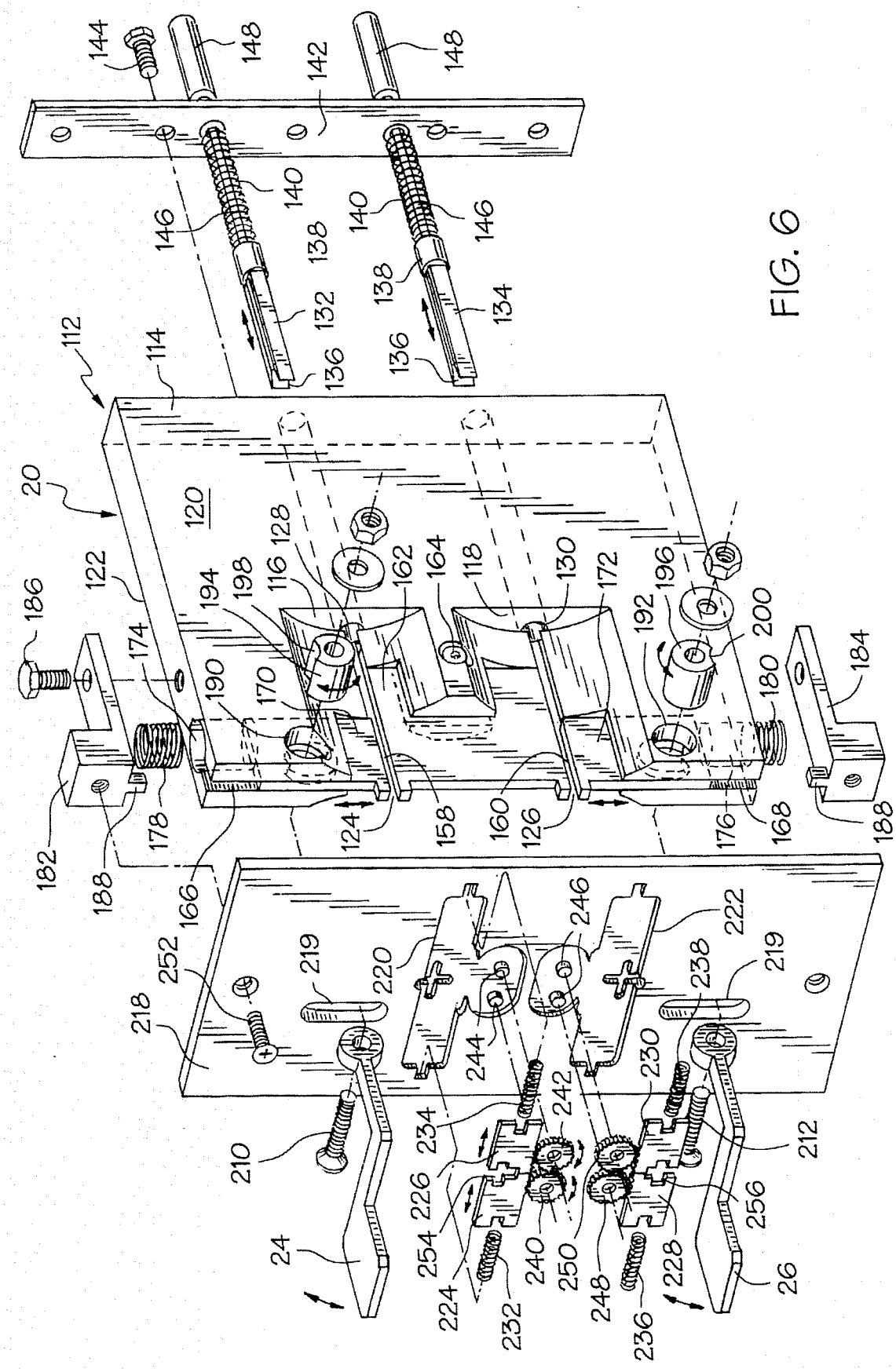
FIG. 6 is a detail showing an exploded, perspective view of the draw block assembly of the machine of FIG. 1.

As shown in FIG. 6, the double-sided duplicating module 20 includes a clamp block assembly, generally designated 112. The clamp block assembly 112 includes a clamp block 114 having upper and lower scalloped cutouts 116, 118 on opposing lateral faces 120, 122 (see also FIG. 3) in which are centered upper and lower key receiving slots 124, 126. The cutouts 116, 118 provide clearance for the cutter wheels 88, 90 and the presence of the upper and lower cutouts make the clamp block vertically invertible. Key receiving slots 124, 126 communicate with through upper and lower through bores 128, 130 which receive upper and lower tip gauges 132, 134. Tip gauges 132, 134 each terminate in a notch 136 at a forward end, and include a spring seat 138 that supports a compression spring 140 that is seated against a back plate 142 mounted on the clamp block 114 by screws 144. The tip gauges 132, 134 each include a shaft 146 which protrudes through the back plate 142 and terminates in a bushing 148 that is positioned to engage upper and lower microswitches 150, 152. Microswitches 150, 152 are mounted on an L-shaped flange 154 which, in turn, is attached by screws 156 to the back plate 148 (see FIG. 2).

The slots 124, 126 each include a support surfaces 158, 160. In the preferred embodiment, support surfaces 158, 160 comprise the upper and lower edges of a gauge plate 162 which is retained within the clamp block 114 by set screw 164. The clamp block 114 includes upper and lower vertical slots 166, 168 which receive upper and lower jaws 170, 172, respectively. Slots 166, 168 includes cylindrical segments 174, 176 which receive compression springs 178, 180, which are, in turn, retained by spring blocks 182, 184. Blocks 182, 184 are attached to the jaw block 114 by screws 186, and include a forwardly positioned and inwardly extending nose 188 which is shaped and positioned to engage the slots 166, 168 in order to properly locate the blocks 182, 184 with respect to the draw block 114.

The jaw block 114 includes lateral upper and lower cylindrical openings 190, 192 which receive cams 194, 196 that are generally cylindrical in shape but include scallops 198, 200. Jaws 170, 172 each include lateral openings 202, 204 which are eccentrically shaped and include a nose 206, 208, shaped to engage the scallops 198, 200 of the cams 194, 196 associated with them. Levers 24, 26 are attached by screws 210, 212 to the cams 194, 196. Consequently, an upward pivoting movement of the levers 24, 26 causes their respective cams 194, 196 to pivot, thereby moving the scallops 198, 200 of the cams out of engagement with the noses 206, 208 of the upper and lower jaws 170, 172. This causes the jaws 170, 172 to be displaced away from the support surfaces 158, 160, and compress the springs 178, 180. Conversely, a downward pivoting of the levers 24, 26 causes their respectively cams 194, 196 to pivot the scallops 198, 200 into engagement with the noses 206, 208, thereby allowing the springs 178, 180 to urge the jaws 170, 172 inwardly toward the support surfaces 158, 160, respectively. This inward travel is sufficient to clamp the original and blank keys 214, 216 (see FIG. 2) and hold the keys at the precise distance between surfaces 158, 160.

The front panel 218 of the double-sided module 20 includes upper and lower slots 219 through which levers 24, 26 extend, and recesses 220, 222 which receive upper and lower lateral jaws 224, 226, 228, 230. Upper jaws 224, 226 engage compression springs 232, 234 which bias the jaws inwardly, and similarly, compression springs 236, 238 bias jaws 228, 230 inwardly. Upper jaws are toothed along lower surfaces thereof and engage alignment gears 240, 242, which are in turn mounted on bosses 244 protruding from the recess 220. Similarly, bosses 246 support meshing gears 248, 250 which engage tooth edges of jaws 228, 230. Consequently, the jaws 224–230 are urged toward each other and are centered with respect to the cover plate 218 and with respect to jaw block 114, to which cover plate 218 attached by screws 252.

The jaws 224–230 include notches 254, 256 shaped to receive the blades of the original and blank keys, respectively and are aligned with the slots 124, 126. Consequently, when the operator inserts original and blank keys 214, 216 (FIG. 2) into the notches 254, 256, the jaws 224–230 align the bases of the key blades, while tip gauges 132, 134 receive the key blade tips in their respective notches 136 and thereby align the key blades relative to the clamp block 114 such that the centers of the key blades are aligned with the support surfaces 124, 126. The keys 214, 216 are in positioned to be clamped by jaws 170, 172 in the manner previously described.

Figure 17:
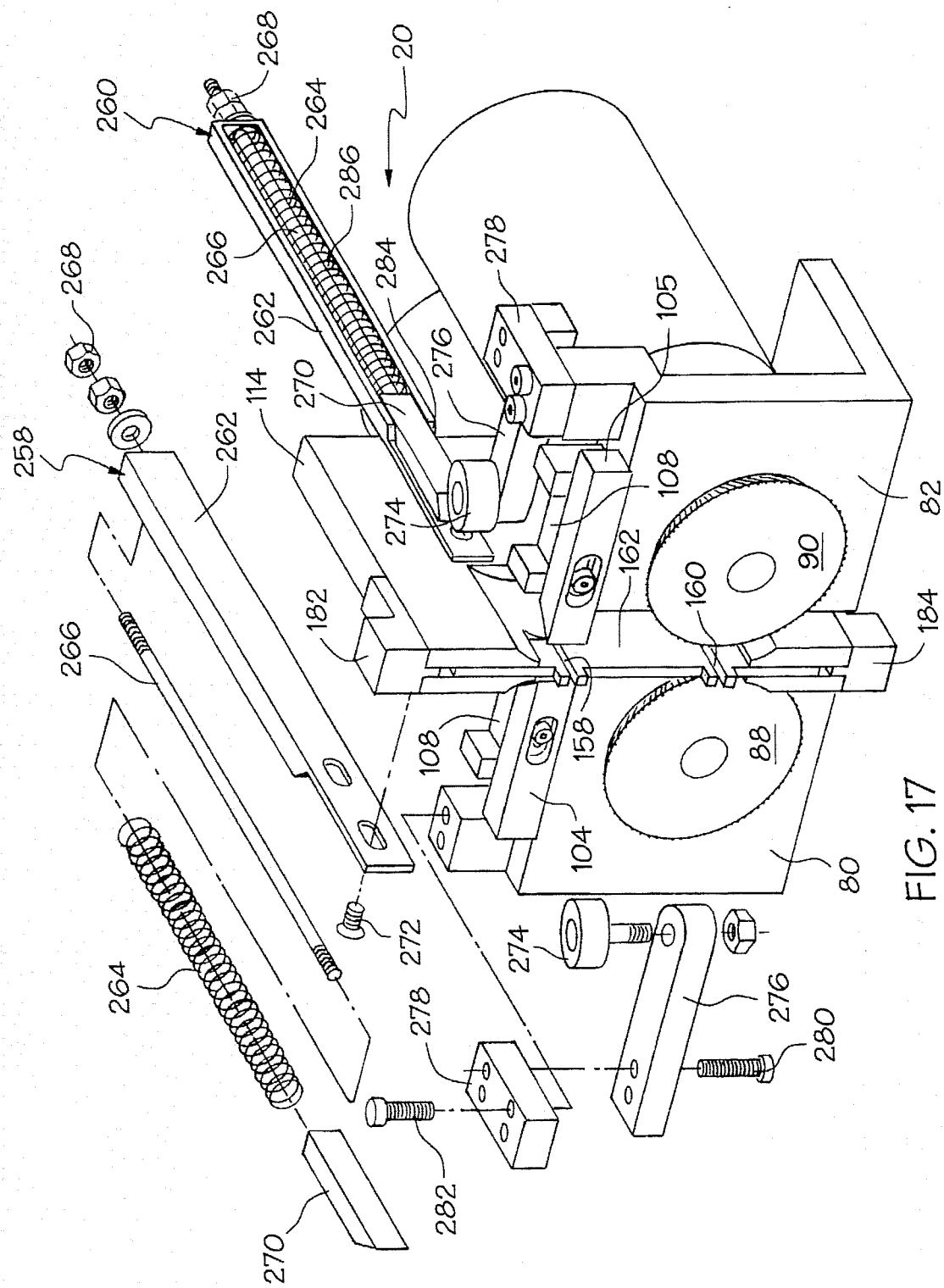
FIG. 17 is a detail showing a perspective, partially exploded view of the cutter block and clamp block components of the double-sided duplicating module of the machine of FIG. 1.

As shown in FIG. 17, the double-sided duplicating module 20 includes a pair of shot block assemblies 258, 260, which are used to separate the cutter blocks 80, 82 and thereby space the cutter wheels 88, 90 away from the key blank 216 (FIG. 2) during the return travel of the travel table 42 (see FIG. 14). The shot blocks 258, 260 each include an elongate, open channel 262 which receives a compressions spring 264 that is telescoped over a retaining rod 266 which is retained in the end of the channel 262 by knots 268 and is threaded into a plastic wedge or block 270 at a forward end. The channels 262 are mounted to the clamp block 114 by screws 272. The blocks 270 are shaped to slide within the channels 262.

The shot block assemblies 258, 260 also include cam follower wheels 274 which are mounted on cam arms 276 which are pivotally connected to mounting blocks 278 by screws 280. Mounting blocks 278 are mounted by screws 282 to the cutter blocks 80, 82.

Consequently, when the motor 52 (FIG. 14) is actuated to rotate cam 58 and thereby reciprocate the travel table 42, the travel table carries the cutter blocks 80, 82 rearwardly relative to the clamp block 114. This causes the follower wheels 274 to engage their respective blocks 270 and urge them inwardly along the channels 262, thereby compressing the springs 264. This movement does not force the cutter wheels 88, 90 apart so that the cutter wheels are free to perform a cutting operation on a double-sided key 214 (see FIGS. 2 and 4). However, when the rearward travel of the cutter blocks 80, 82 places the cam followers 274 into engagement with the bevelled edges 284 of the channels 262, the follower wheels ride outwardly onto the outer, lower edges 286 of the channels and force the cutter blocks 80, 82 and cutter wheels 88, 90 sidewardly away from the key 214. The cam arms 276 are prevented from pivoting forwardly by engagement with the blocks 108 mounted on the upper surfaces of the cutter blocks 80, 82. Once the cam followers 274 have engaged the channels 262 and have ridden up onto the edges 286, they no longer contact the blocks 270 so that the blocks are free to spring forwardly to the positions shown in FIG. 17.

When rotation of the cam 58 causes the travel table 42 to begin its return or forward motion (see FIG. 4) the cam wheels 274 ride on the outer surfaces of the blocks 270 and thereby maintain the cutter wheels 88, 90 in their space apart relation until the end of the travel of the travel table 42. At the end of the travel, the cutter wheels 88, 90 remains space apart in order to provide clearance for the ease of removal of the finish key and original key, and subsequently the insertion of a second pair of the original and blank keys.

Figure 19:
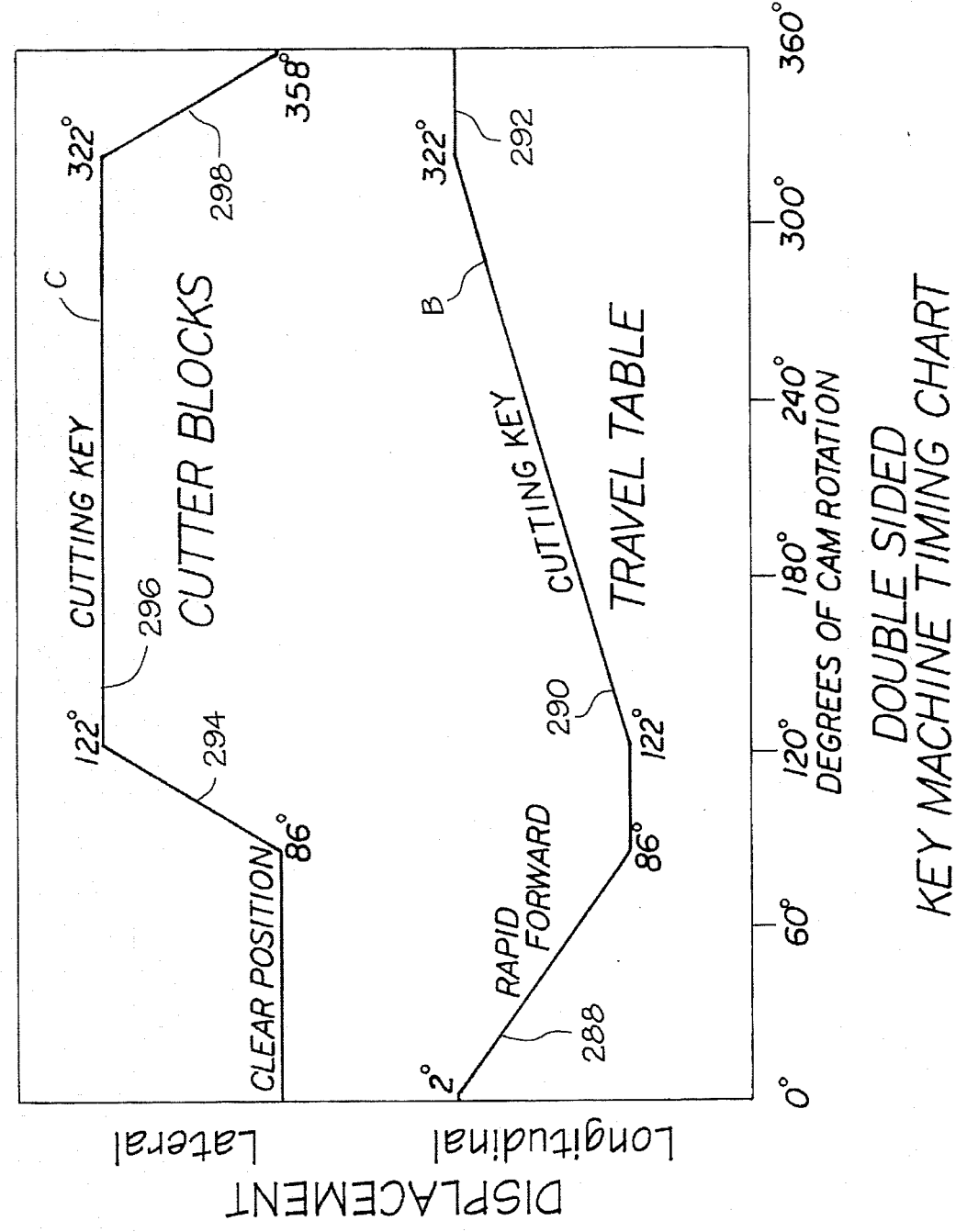
FIG. 19 is a graph showing the path of the cutter blocks for the double-sided duplicating module of the machine of FIG. 1.

The movement of the travel table 42 and cutter blocks 80, 82 is shown graphically in FIG. 19. As shown in Curve B in FIG. 19, the rotation of the cam 58 at first causes a rapid forward movement of the travel table 42 as shown by segment 288. This allows follower wheels 274 to clear their respective blocks 270 completely, thereby allowing the cutter wheels 88, 90 to move towards each other to their innermost position which allows them to engage and begin cutting both sides of the blank key 216 (FIG. 2). Similarly, the followers 104, 105 move inwardly to engage the notches of the blade of the original key 214. Continued rotation of the cam 58 causes the travel table to begin a rearward movement wherein the followers 104, 105 traced the notch pattern of the original key 214 and the cutter wheels 88, 90 cut an identical pattern on the blank 216. This rearward travel is represented by segment 290 in Curve B. At the end of the travel, the continued rotation of the cam 58 causes a rapid return movement of the travel table 42 and cutter blocks 80, 82, as shown in segment 292. The entire cycle takes approximately 30 seconds, so that the cutting travel represented by segment 290 last approximately 17 seconds, while the return travel lasts only approximately 3 seconds.

Curve C graphically represents the spading the cutter blocks from their start or clear possession through an entire cycle of operation. When the cam 58 is rotated to start the cutting cycle, the cutter wheels 88, 90 are moved at first toward each other, as represented by segment 294, then continue in a inner position as the key is cut, represented by straight segment 296. It should be noted that, in reality, segment 296 with have a jagged contour corresponding to the relatively small movement of the cutters as they trace the notch pattern on the key blade. At the end of the outward travel of the table 42, the cutter wheels then move quickly apart from each other to the clear position, represented by segment 298.

In summary, the operation of the double-sided duplicating module 20 is as follows: The operator first inserts the original and blank keys 214, 216 into their respective slots 32, 34, in a fashion similar to inserting the keys in the locks. Insertion of the keys 214, 216 stops when the shoulders of the keys encounter the jaw pairs 224–230. The keys 214, 216 are prevented from skewing relative to the module 20 by the engagement of the tips of the keys with the tip gauges 132, 134, and the centering effect of the jaws 224–230 on the bases of the key blades. The operator then depresses lever 24, 26 which pivots cams 194, 196 to release jaws 170, 172 and allow the springs 178, 180 to urge the jaws inwardly to clamp the keys 214, 216 against the support surfaces 158, 160. At this point, the keys 214, 216 are properly spaced from each other, clamped with the appropriate amount of clamping force, and are aligned with respect to each other, all automatically. It should be noted that the jaws 224, 226 are shaped to allow for a wide range of key thicknesses and widths. Similarly, the tip gauges 132, 134 and slots 124, 126 accommodate keys of a wide variety of blade lengths.

Once the keys 214, 216 have been clamped, the table motor 52 and cutter motors 84, 86 are actuated by the operator. The travel table 42 begins its cycle, controlled by the cam 58 in a manner previously described, such that the travel table first moves forwardly to disengage the follower wheels 274 from the shot block assemblies 258, 260, which permits the cutter wheels to move together to engage the blank key 216, and the follower 104, 105 to engage the notch pattern of the original key, to being a cutting pass along the keys 214, 216. Continued rotation of the cam 58 then causes the travel table 42 to move rearwardly, at which time the cutter wheels 88, 90 cut a notch pattern on the double-sided blank 216 which is identical to the pattern of the original 214.

At the end of the cutting pass, continued rotation of the cam 58 causes a rapid return of the travel table 42 along a return pass. The cutter wheels 88, 90 remain spaced apart as a result of engagement of the follower wheels 274 with the shot block assemblies 258, 260 in the manner previously described. At the end of the entire cycle, the locking levers 24, 26 are pivoted to release the jaws 170, 172 from the original key 214 and now finished blank key 216, and the keys may now be removed from module 20, without engaging the cutter wheels 88, 90.

Single-Sided Duplicating Module

Figure 7:
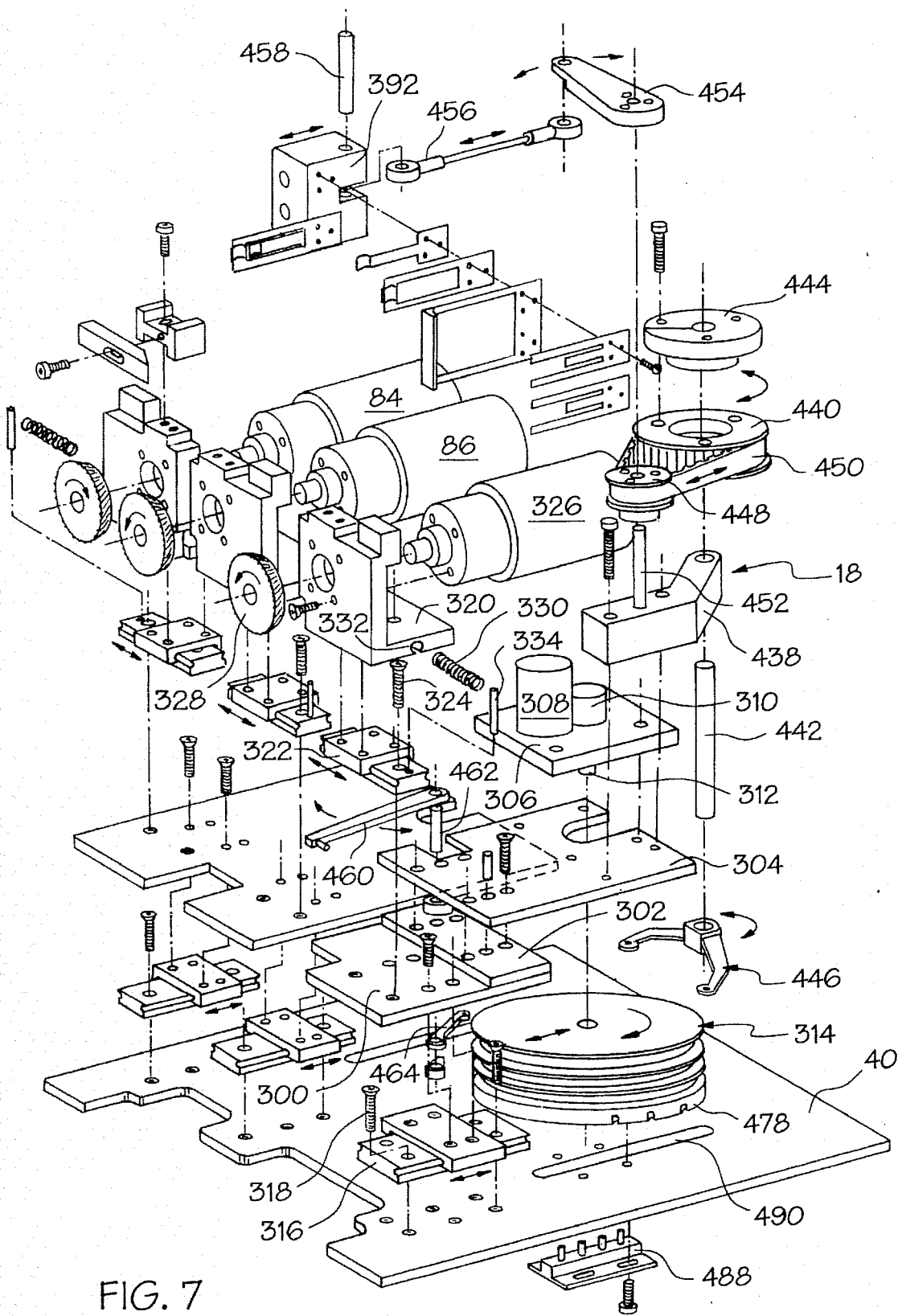
FIG. 7 is an exploded, perspective view of the single and double-sided cutter of the machine of FIG. 1.

As shown in FIG. 7, the single-sided duplicating module 18 includes a travel table 300 having a rear-mounted spacer plate 302 on which is mounted a travel plate extension 304. A motor support plate 306 is mounted on the travel plate extension 304 and supports a cam motor 308 and pinion mechanism 310 having an output shaft 312. Output shaft 312 is journaled into a stacked cam assembly, generally designated 314. Travel plate 300 is mounted on a longitudinal slide 316, which in turn is mounted on base plate 40 by screws 318.

Single-sided cutter block 320 is mounted on a transverse slide 322 which in turn is mounted on travel plate 300 by screws 324. Cutter block 320 supports single-sided cutter motor 326 which drives cutter wheel 328. Cutter block 320 receives a compression spring 330 which is retained within a bore 332 by a pin 334 which is mounted on the end of slide 322 (see also FIG. 3).

Figure 13:
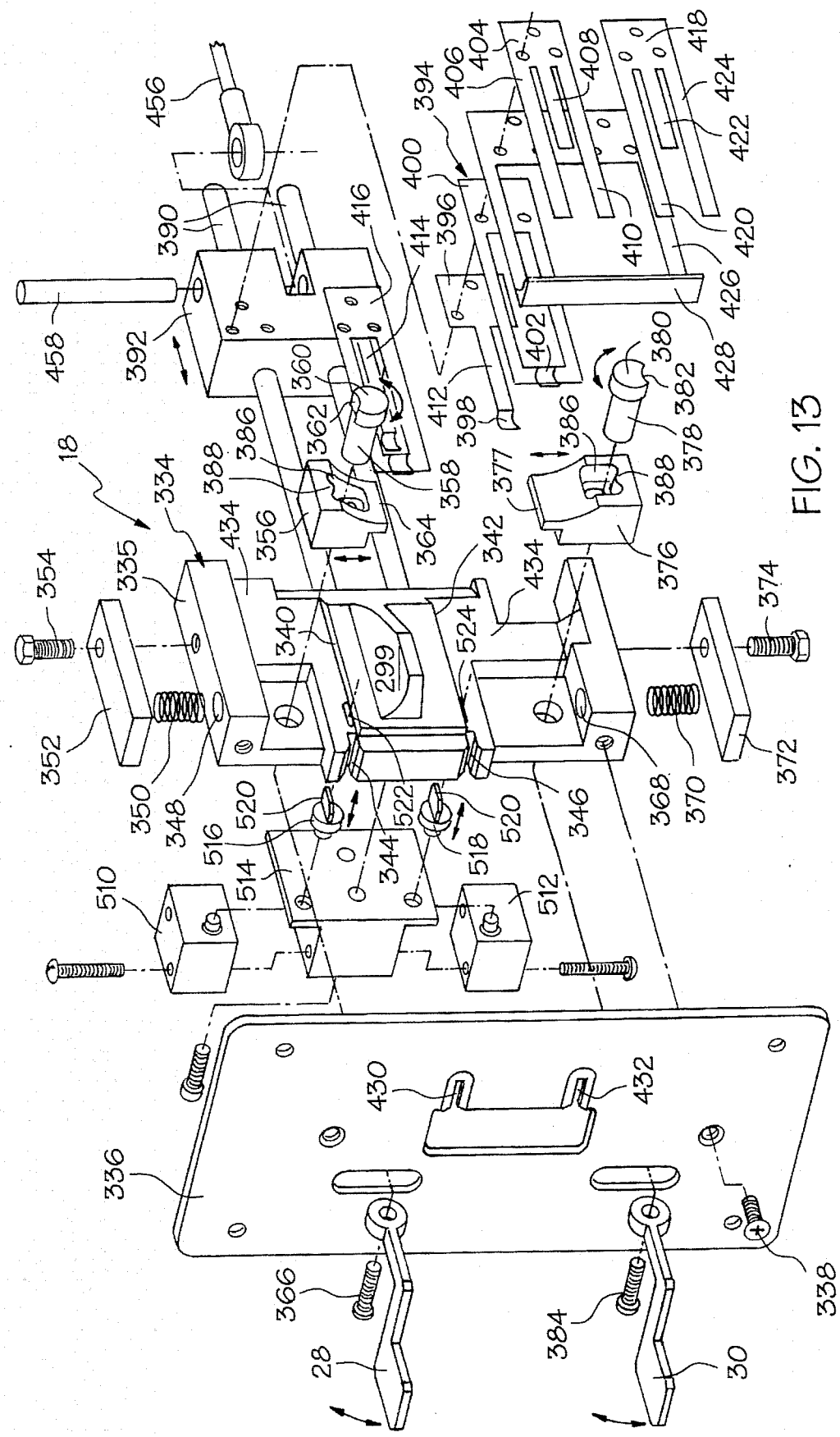
FIG. 13 is a detail showing a perspective, exploded view of the jaw block assembly of the single-sided duplicating module of the machine of FIG. 1.

As shown in FIG. 13, the single-sided duplicating module 18 also includes a clamp block assembly, generally designated 334, having a clamp block 335 attached to a cover plate 336 by screws 338. Cover plate 336, in turn, is attached to the front panel 70 of the housing 12 (see FIG. 1), so that the clamp block 335 is attached to the housing 12 separate from the travel table 300 and associated components. The clamp block 335 includes upper original key support ledge 340 and lower blank key support ledge 342, which are spaced from each other a precise distance. The forward portion of the clamp block 335 includes cutouts 344, 346 to provide clearance for keys inserted in the module 18. The clamp block 335 includes a bore 348 which receives a compression spring 350 that is retained by a plate 352 secured to the top of the block by a screw 354. Spring 350 urges against an upper clamp jaw 356 which is shaped to receive a cam 358 having a head 360 which includes a notch 362. Jaw 356 includes an upper clamping surface 364 which faces key support ledge 340. Cam 358 is attached to upper lever 28 by screw 366.

Similarly, clamp block 334 includes a lower bore 368 which receives compression spring 370 that is retained therein by plate 372 which is secured to the underside of the block 334 by screw 374. Spring 370 urges against a lower jaw 376, having clamping edge 377, which is shaped to receive a cam 378 having a head 380 which includes a notch 382. Cam 378 is attached to lower lever 30 by screw 384.

Upper and lower jaws 356, 376 each include recesses 386 having dimples 388 shaped to engage the notches 362, 382 over the corresponding cams 358, 378. Consequently, rotation of the cams 358, 378 to the positions shown in FIG. 13 causes engagement of the dimples 388 with their respective notches 362, 382, which allows the springs 350, 370 to urge the jaws 356, 376 inwardly, thereby clamping their respective edges 364, 377 against the support ledges 340, 342, respectively. Alternately, an upward pivoting of the levers 28, 30 causes a rotation of the cams 358, 378 which disengages the dimples 388 from the notches 362, 382, causing outward movement of the jaws 356, 376 away from their respective support ledges 340, 342, thereby releasing the clamping pressure exerted by springs 350, 370.

As shown in FIG. 13, the clamp block assembly 334 includes rearwardly extending rails 390 on which a spring block 392 is mounted for slidable movement. Spring block 392 supports an alignment spring assembly, generally designated 394. Assembly 394 includes inner spring element 396 having curved tip 398, intermediate element 400, having curved tip 402, and outer element 404. At least outer element 404 is made of spring steel and includes upper, intermediate and lower arms 406, 408, 410. Intermediate element 408 overlies the shank 412 of element 396 to provide added spring force. Lower spring element 414 is constructed similarly to element 396 and is positioned beneath intermediate element 416, which is similar in construction to element 400. Outer element 418, similar in construction to element 404 includes arms 420, 422 and 424.

Plate 426 is positioned between outer elements 404 and 418 and intermediate elements 400, 416 and includes a shoulder stop 428 which is oriented vertically.

Intermediate arm 422 urges against the shank of the element 414 which corresponds to shank 412 of element 396. The stacking of elements 396, 400, 404 is positioned to engage and urge a single-sided key original 430 (see FIG. 4) against the clamp block 335 when the spring block 392 is in a forward position on rails 390. Similarly, stack spring elements 414, 416, 418 are shaped to urge a blank key 432 (see FIG. 1) sidewardly against the clamp block 335 when the spring block 392 is in a position forward of that shown in FIG. 13.

The operation of the clamp block assembly 334 is as follows. The operator first inserts original key 430 and blank key 432 through notches 433 formed in cover plate 336. The notches 433 are positioned relative to the clamp block 335 such that the keys 430, 432 slide along the support ledges 340, 342. The key blades are urged against the side wall 434 of the block 335 by the upper and lower spring assemblies 394, which hold the blades in alignment relative to each other. The insertion of keys 430, 432 continues until the shoulders of the keys contact the stop 428, which is part of the spring assembly 394. At this point, the keys 430, 432 are inserted to the proper depth, and are aligned relative to each other. The levers 28, 30 are then pivoted downwardly, which, as explained previously, allow the springs 350, 370 to urge the jaws 356, 376 inwardly to clamp the key blades securely against the support ledges 340, 342. At this time, the keys are not only aligned relative to each other but are spaced the appropriate distance to be engaged by the follower 436 (which is mounted on the top of the cutter block 320) and cutter wheel 328.

The travel table extension 304 supports a pulling block 438 which, in turn, supports a large pulley or timing gear 440 that is retained on a shaft 442 by an end plate 444. Shaft 442 is attached at a lower end to a double arm cam follower 446 that engages the stacked cam assembly 314. Small timing gear 448 is driven by a timing belt 450 that extends about the small timing gear and the large timing gear 440. Small timing gear 448 is rotatably mounted on a shaft 452 which is mounted in pulley block 438. A lever arm 454 is attached to the small timing gear 448 and is pivotably connected to link arm 456. Link arm 456 is pivotably connected to spring block 392 by a pin 458 (see also FIG. 13). Consequently, rotational movement of small timing gear of 448 on shaft 452 causes pivotal movement of link arm 454 which results in slidable movement of the spring block 392 along rails 390, relative to clamp block 335. As will be explained later, this movement causes the retainer spring assembly 394 to move into and out of engagement with original and blank keys 430, 432 (FIG. 1) inserted into notches 430, 432.

As shown in FIG. 7, a cutter block displacement arm 460 is mounted on a shaft 462 which is pivotally mounted on spacer plate 302. Shaft 462 extends through plates 300, 302 and is attached to cam follower 464 which engages stack cam assembly 314 as will be explained later.

Figure 8:
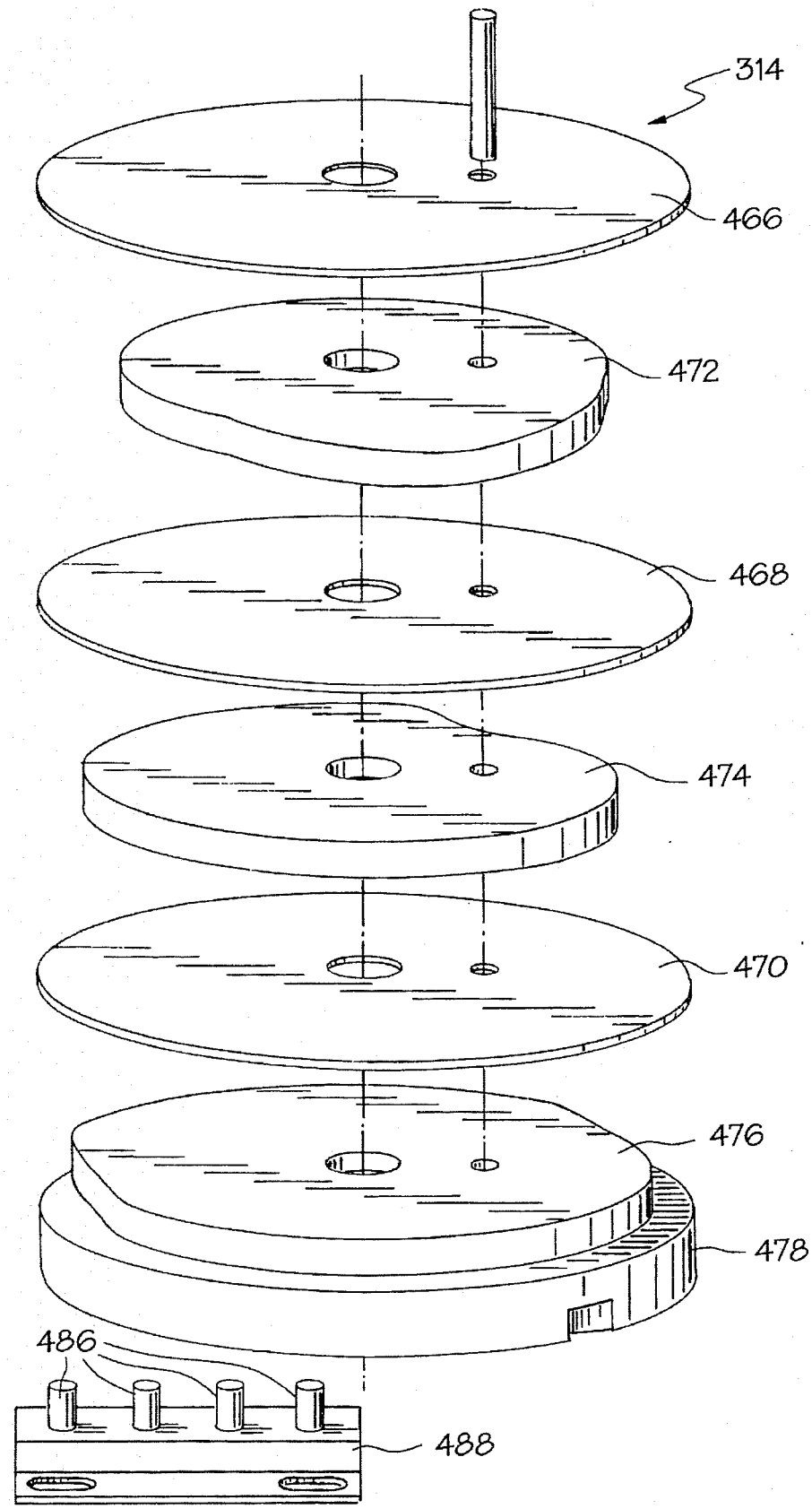
FIG. 8 is a detail showing an exploded, perspective view of the stacked cam assembly of the double-sided duplicating module of the machine of FIG. 1.
Figure 9:
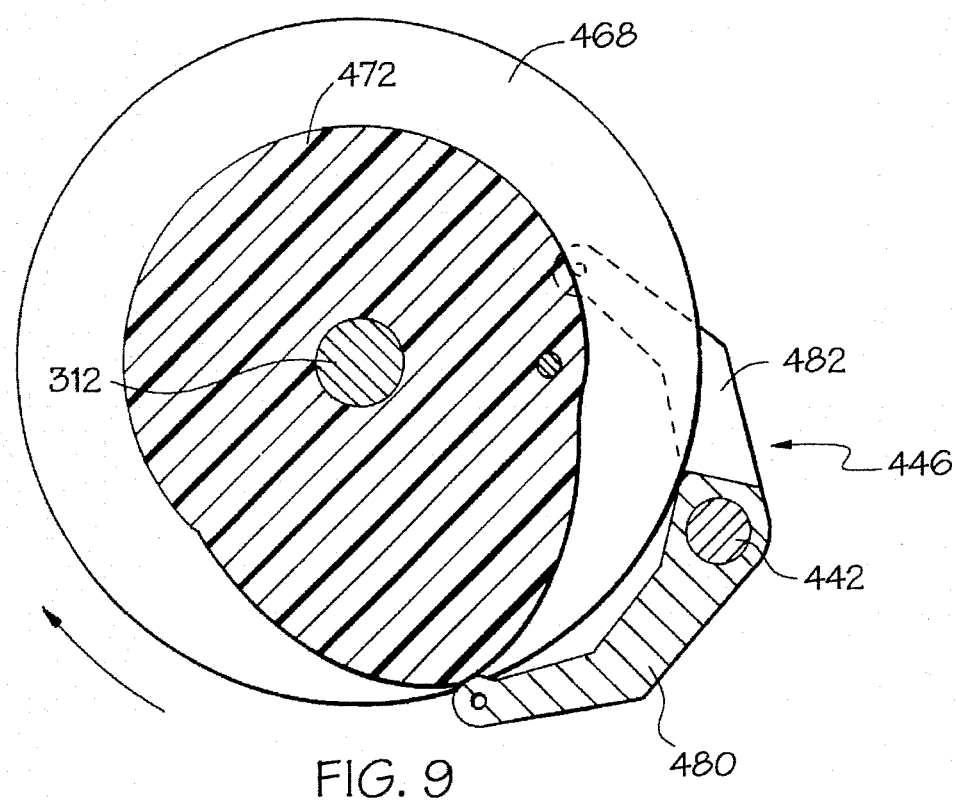
FIGS. 9, 10, 11 and 12 are each a detail showing a different cam element of the cam assembly of FIG. 8 in section, and the cam follower associated with each cam element.
Figure 10:
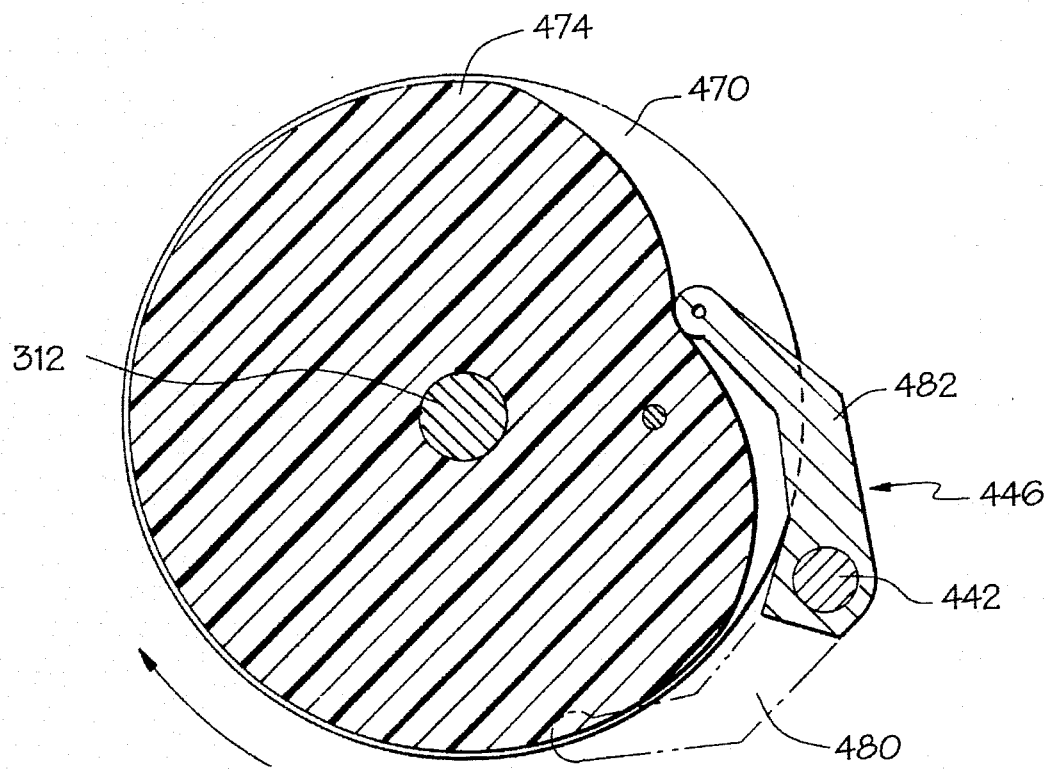

As shown in FIG. 8, stacked cam assembly 314 includes upper spacer plate 466, intermediate spacer plate 468, and lower spacer plate 470, which separate upper cam 472, intermediate cam 474 and lower cam 476. Lower cam 476 is integral with bottom cam 478. As shown in FIGS. 9 and 10, double arm cam follower 446 includes upper and lower arms 480, 482 which are positioned to engage upper and intermediate cams 472, 474, respectively. Consequently, rotation of cam assembly 314 by motor 308 causes rotation of upper and intermediate cams 472, 474, which results in a rocking or reciprocating pivotal motion of double armed cam 446. This causes a similar reversing motion of large and small timing gears 440, 448, which causes a reciprocating motion of spring block 392 along rails 390.

Figure 11:
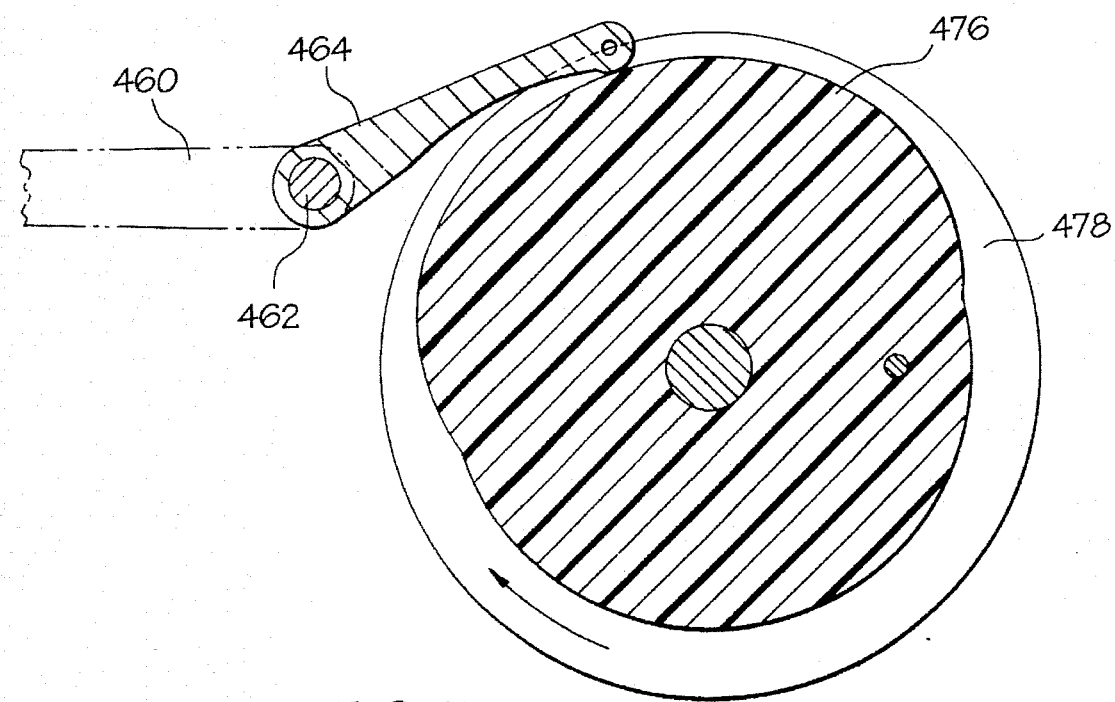

As shown in FIG. 11, cam follower 464 engages lower cam 476. Consequently, the rotation of cam assembly 314 by motor 308 causes cam follower 464 to pivot about shaft 462, which causes cutter block displacement arm 460 to pivot laterally to displace the cutter block 360 laterally, thereby compressing the spring 330. As will be explained later, the cutter block 330 is displaced outwardly away from the keys 430, 432 in the forward return trip of the cutter wheel and follower and allows the spring 330 to displace the cutter wheel and follower against the keys during the rearward cutting trip.

Figure 12:
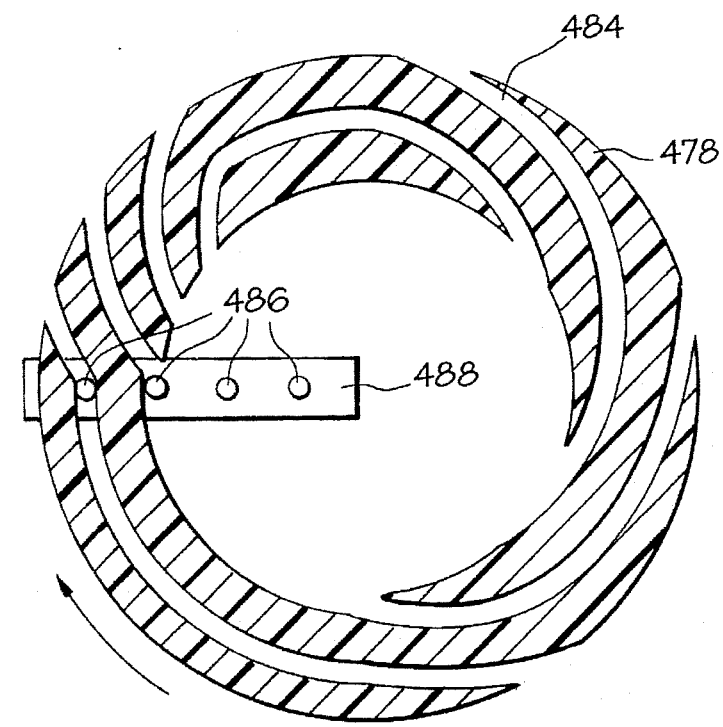

As shown in FIGS. 7 and 12, the bottom cam 478 includes a plurality of spiral slots 484 which are shaped to engage pins 486 extending upwardly from a pin block 488 which is mounted to the underside of the base plate 40. Base plate 40 includes a slot 490 which provides clearance for the pins 486 to protrude upwardly into the slots 484. Consequently, rotation of the cam assembly 314 causes the stationary pins 486 to slide along the slots 484, which causes the travel table 300 and associated support plates 302, 304 to move rearwardly, then forwardly on slides 316 to perform the cutting and return passes, as will be explained later.

The operation of the single-sided duplicating module 18 is as follows. Initially, the system is at rest, wherein the lever arm 460 displaces the cutter block 320 sidewardly away from the clamp block 335, thereby providing clearance for insertion of keys 430, 432. When the keys 430, 432 are inserted, the levers 28, 30 are then depressed, which allow the clamping jaws 356, 376 to clamp the keys in alignment. The keys are aligned longitudinally by the contact of the shoulder of the keys with the stop 428. When the cam motor 308 is activated, as will be explained with reference to the interlock system discussed below, the cam assembly 314 is rotated. At this time, the cutter motor 326 is activated which rotates the cutter wheel 328. Rotation of the cam assembly 314 initially causes rotation of the large and small timing gears 440, 448, which causes the spring block 392 to slide rearwardly along rails 390 away from engagement with the keys 430, 432, to provide clearance for the cutter wheel 328 and follower 436. The stop 428 is bent away form the keys 430, 432 by a beveled wedge 299, which protrudes from side wall 434. Continued rotation of the cam assembly 314 causes the lever arm 460 to pivot away from the cutter block 320, which allows the spring 330 to urge the cutter block sidewardly so that the follower 436 and cutter wheel 328 engage the original and blank keys 430, 432, respectively.

Continued rotation of the cam assembly causes the slots 484 of the bottom cam 478 to move against the fixed pins 486, which causes the travel table assembly 300, 302, 304 to begin a rearward movement relative to the clamp block 335 and keys 430, 432 and makes a cutting pass. The follower 436 now traces the notch pattern of the blade of the original key 430, and the cutter wheel 328 cuts the corresponding notch pattern in the blank key 432 as the cutter table 300 moves rearwardly. The cutter block 320 moves laterally on slide 322 to allow the notch pattern to be cut. At the end of the cutting pass, continued rotation of the cam 314 causes the lever arm 460 to move laterally away from the clamp block 335, which causes a displacement of the cutter block 320. This disengages the follower 436 and cutter wheel 328 from the original key 430 and now finished blank key 432. Continued rotation of the cam assembly 314 causes the travel table 300 to move forwardly in a return pass to the rest position. The stop 428 again is bent by wedge 299 away from the keys 430, 432.

Figure 20:
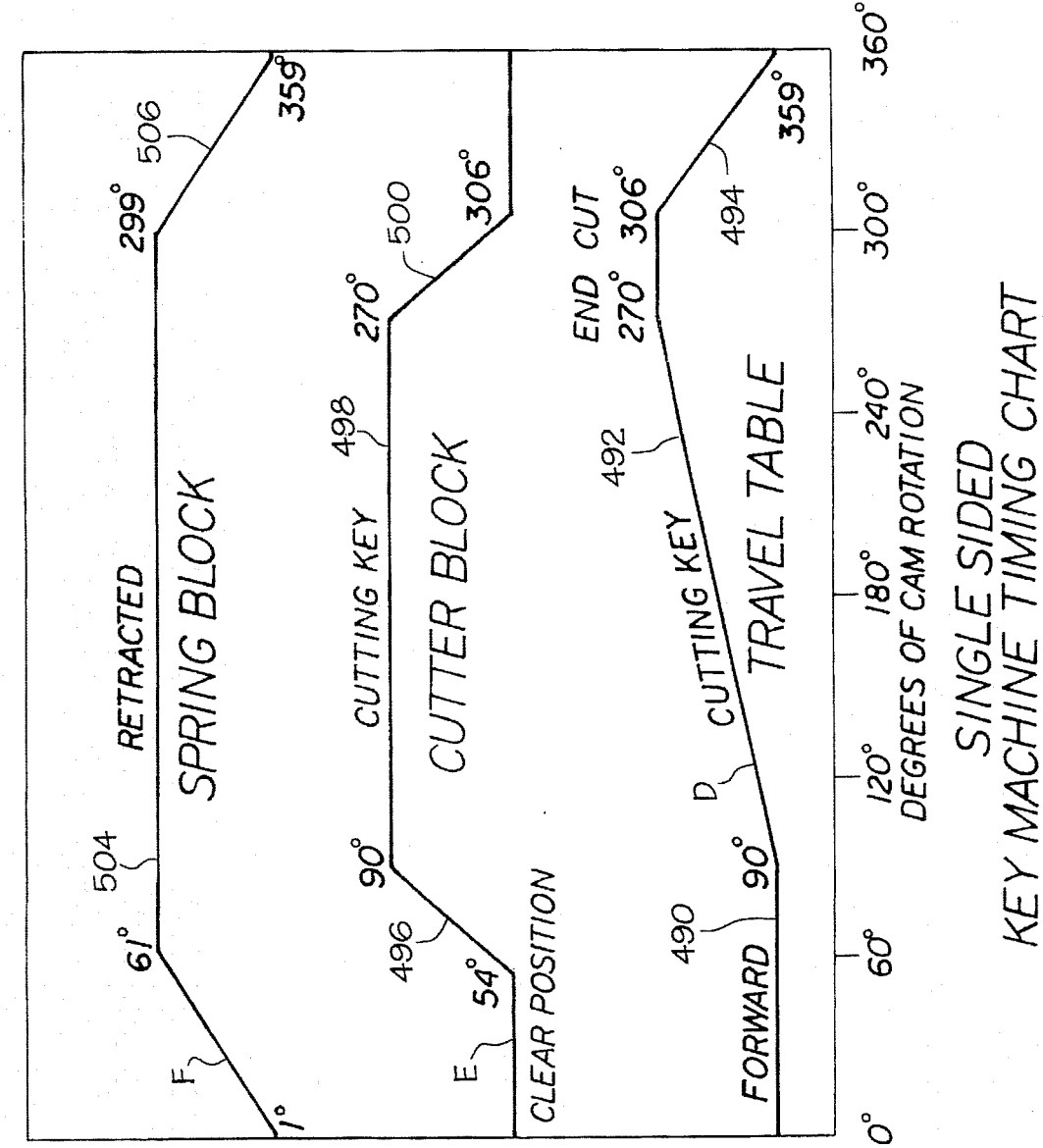
FIG. 20 is a graph showing the movement of the alignment block and cutter of the single-sided duplicating module of the machine of FIG. 1.

This movement is shown graphically in FIG. 20. Curve D shows the displacement of the travel table 300 versus time. Initially, the travel table does not move, as represented by segment 490, while the spring block 392 is displaced rearwardly and the cutter block 320 displaced laterally. Segment 492 represents the rearward displacement of the table 320 during the initial travel path during which the cut is made. Segment 494 represents the relatively rapid forward movement of the table once the cutting activity has been completed.

Curve E represents the sideward displacement of the follower 436 and cutter wheel 328. Initial segment 496 shows the sideward displacement of the cutter block 320 toward the clamp block 335, which brings the cutter wheel 328 and follower 436 into engagement with the blank and original keys 432, 430. As this displacement is completed prior to rearward movement of the table 300. The segment 498 represents the travel of the follower and cutter wheel 436, 328 along the original and blank keys and 430, 432 during the cutting phase of rearward travel, and curve of 500 represents the return travel of the table, during which the cutter block 320 is again displaced sidewardly away from the cutter block 335 to prevent contact of the follower 436 and cutter wheel 328 with the original key 430 and now finished blank key 432.

Curve F represents the rearward travel of the spring block 392. Initial segment 502 shows the rearward travel of the spring block 392 prior to movement of the table 300 and substantially simultaneously with the sideward displacement of the cutter block 320 toward the clamp block 325. The spring block 392 remains rearwardly displaced during the cutting phase or rearward travel of the table 300, as shown by segment 504, then moves forwardly after cutting phase, as indicated by segment 506, which occurs during the return travel of table 300.

Safety Interlock System

An advantage of the duplicating machine 10 of the present invention is that the single and double-sided duplicating modules 18, 20 each include a safety interlock which is incorporated into the electrical system so that it is not possible to actuate the cutter motors 84, 86, 326 unless original and blank keys are in the module that is actuated. As shown in FIG. 2, limits which is 150, 152 are actuated by bushings 148 on the ends of key guides 132, 134. Accordingly, the switches 150, 152 are closed when keys 214, 216 are placed in the double sided duplicating module 20. Similarly, as shown in FIG. 13, microswitches 510, 512 are mounted on switch block 514 which is attached to the side clamp block 335. Switch block 514 supports upper and lower buttons 516, 518 which include blades 520 that protrude through lateral slots 522, 524 formed through the clamp block 335. Blades 520 are beveled or chamfered at their forward edges to facilitate sideward displacement towards the switches 510, 512 when contacted by the noses of keys 530, 532 inserted into the single-sided duplication module 20 in the manner previously described.

Figure 4:
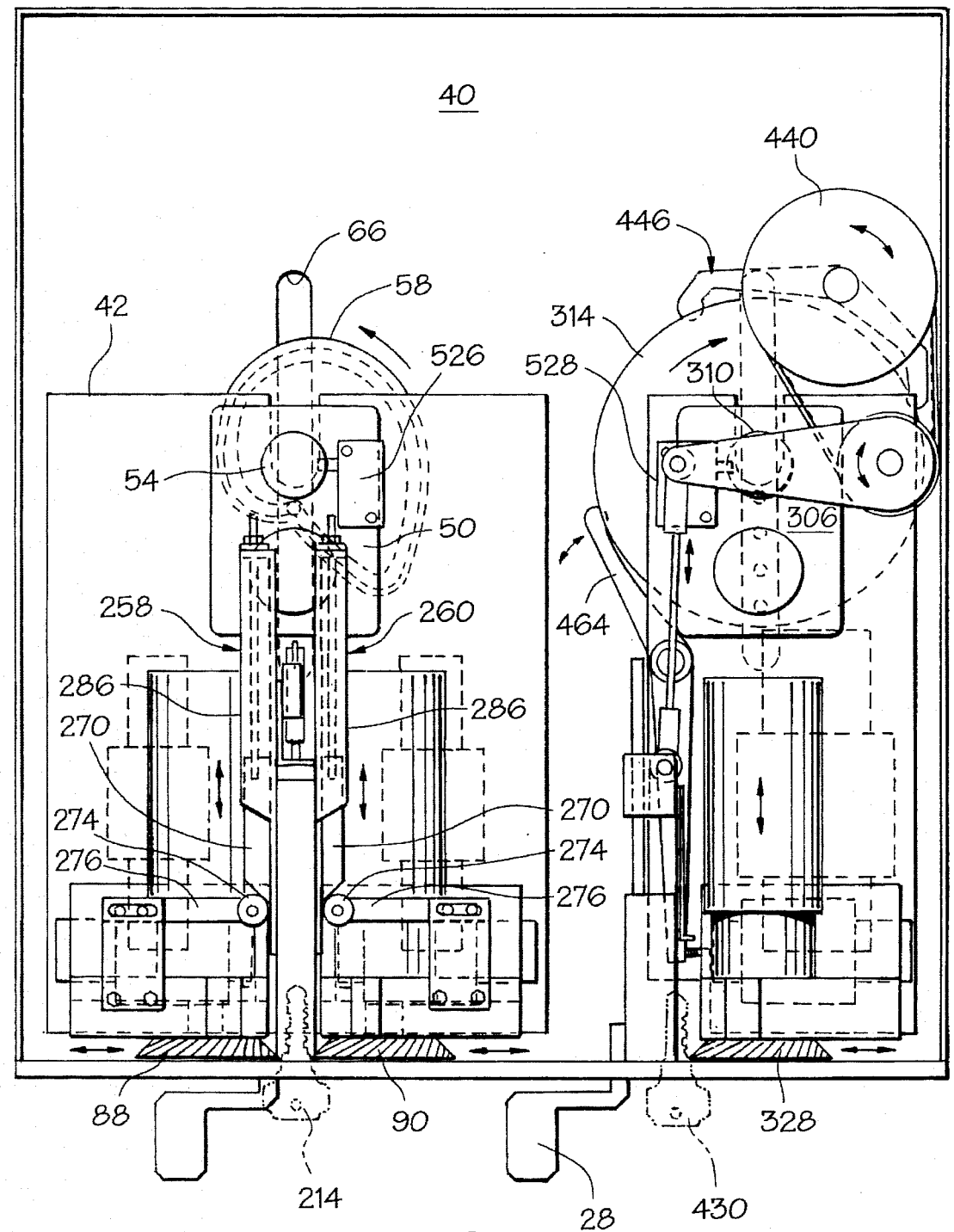
FIG. 4 is top plan view of the machine of FIG. 1 with the top cover removed, showing original single and double-sided keys in phantom.
Figure 5:
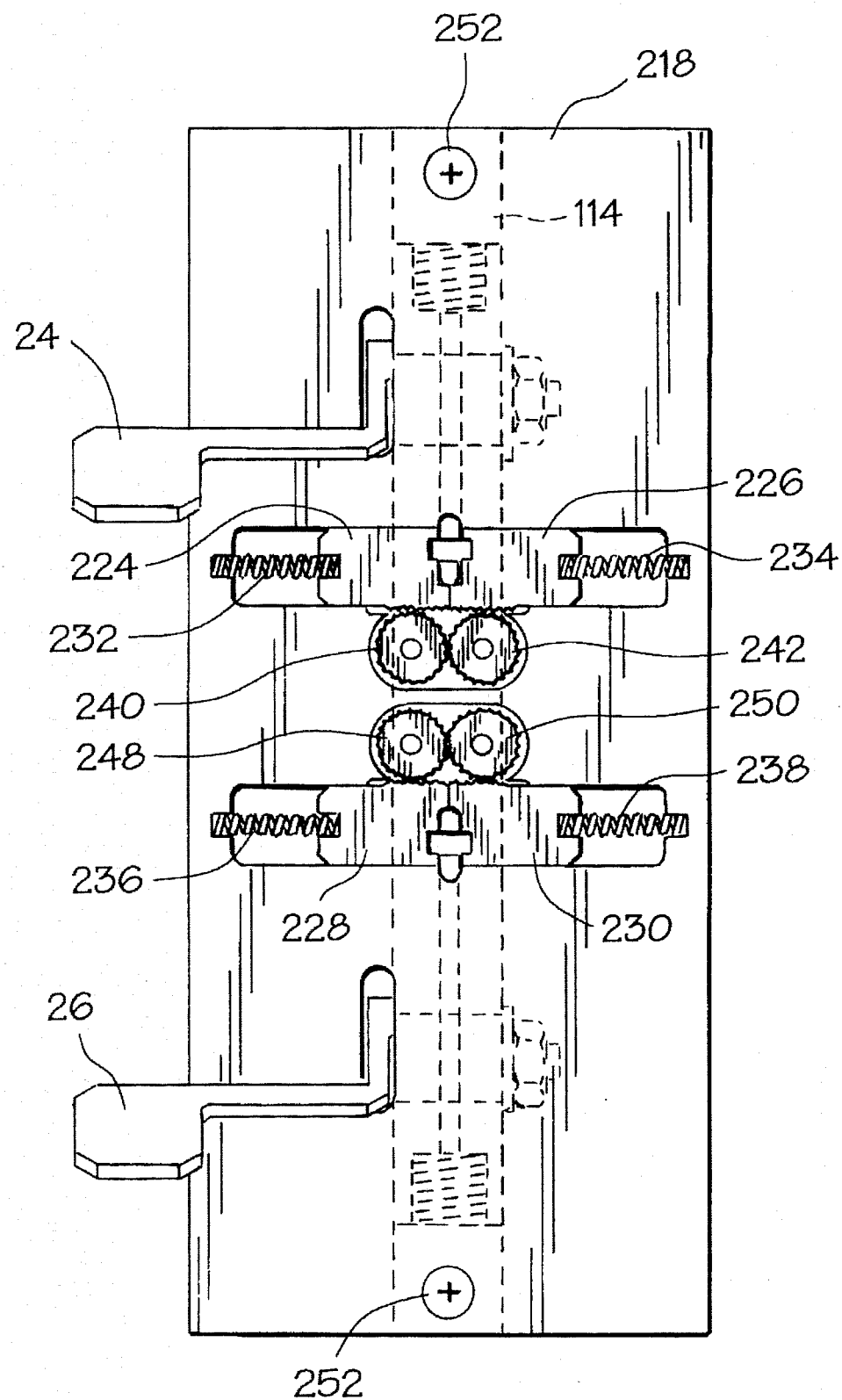
FIG. 5 is a detail showing front elevational view of the locking levers and lateral jaw assembly of the double-sided duplicating module of the machine of FIG. 1.

As shown in FIG. 4 limit switch 526 is mounted on drive motor plate 50 and engages gear mechanism 54. Similarly, limit switch 528 is mounted on motor support table 306 and engages gearing mechanism 310. In the preferred embodiment, the gearing mechanism 54, 310 include a rotating shaft having a recess which is aligned with the button of the micro switch, so that the button contacts the micro switch twice during a complete revolution.

As shown in FIG. 2 micro switch 530 is mounted on a drawer slide 32 and micro switch 532 is mounted on support plate 40. Micro switch 530 is positioned to be opened when the drawer 14 is opened, and micro switch 532 is positioned to be actuated when the cover 12 is opened.

As shown in FIG. 1, control panel 16 includes rocker switches 534, 536 which activate the double and single-sided duplication modules 20, 18, respectively. Each module includes a counter 538, 540. The control panel 16 includes green lights 542, 544 for indicating the ready condition of the double and single-sided duplication modules 20, 18, as well as amber lights 546, 548, which indicate that the modules are performing a cutting operation. The control panel also includes a master power switch 550.

Figure 18:
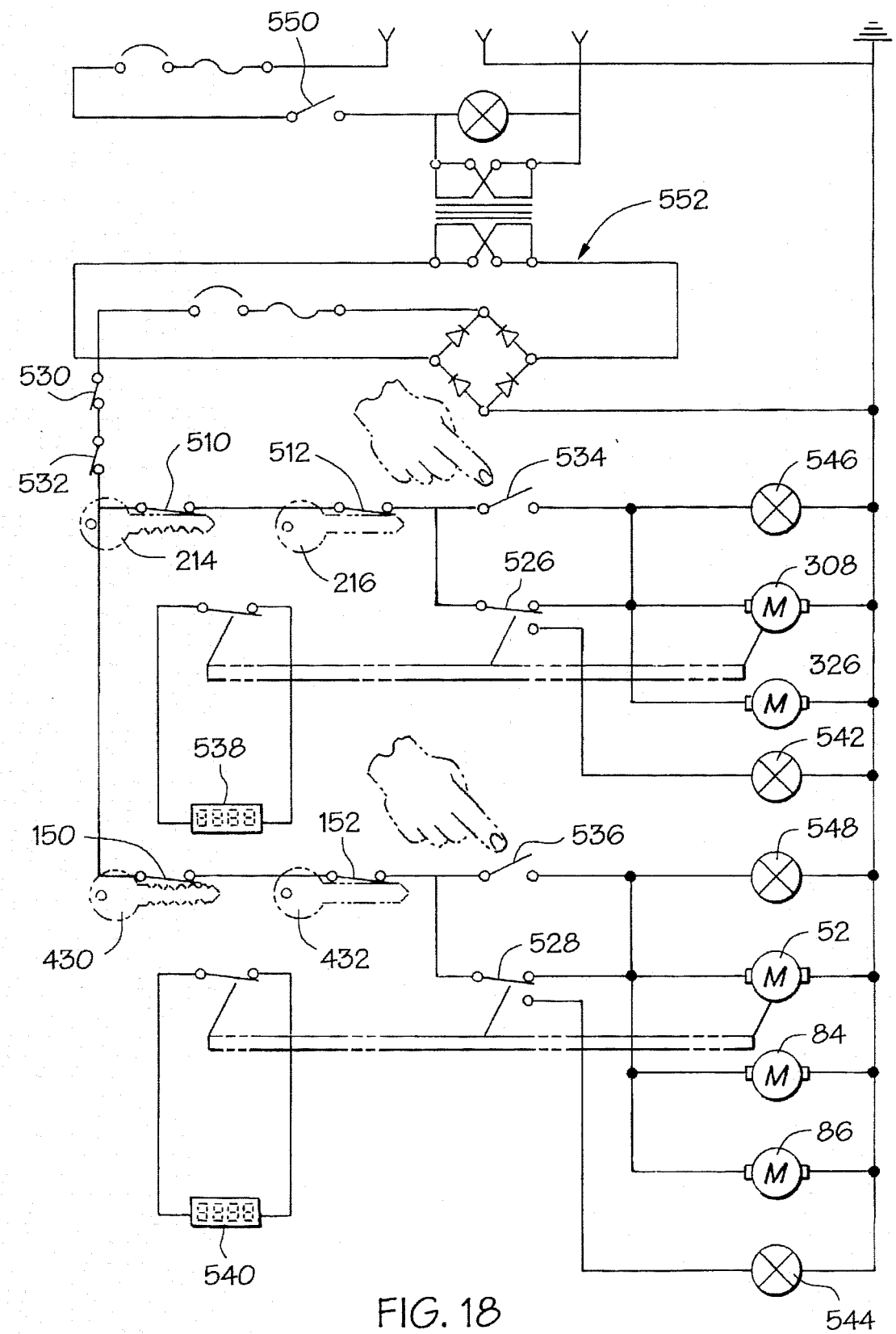
FIG. 18 is an electrical schematic of the machine of FIG. 1.

The electrical and safety interlock system is shown schematically in FIG. 18. Main switch 550 provides power to a transformer and rectifier component, generally designated 552, to provide direct current power to the machine. Switches 530, 532, which are closed when the drawer and housing are closed, must be closed in order for the system to be activated. With respect to the single-sided duplication module 20, the switches 510, 512 must be closed in order for the cam motor 308 and cutter motor 326 to be activated by the operator depressing the switch 534. When power is supplied to the system by closing switch 550, and provided the drawer and housing are closed, insertion of the keys 214, 216 closes switches 510, 512 and energizes the green ready light 542 (limit switch 526 being switched differently than that shown in FIG. 18.). When the power switch for the single-sided duplication module 20 is activated by the operator, green ready light 542 is darkened and amber operation light 546 is energized. Simultaneously, cam motor 308 and cutter motor 326 are energized. Once the cam has made an entire revolution, the limit switch 526 is de-energized which shuts of motors 308, 326 darkens amber light 546 and re-energizes green ready light 542. Counter 538 is then incremented a unit.

Similarly, with respect to the double-sided duplication module 20, the insertion of the keys 430, 432 in the manner previously described discloses switches 150, 152 which energizes green ready light 544 (limit switch 528 being positioned differently then shown in FIG. 18). Actuation of the double-sided duplication module 20 by the operator closing switch 536 darkens ready light 544, eliminates amber operation light 548 and energizes cam motor 52 and cutter motors 84, 86. Once the cam has made a full revolution, the limit switch 528 is depressed a second time to shut off motors 52, 84, 86, darken amber operation light 548 and re-illuminate ready light 544. Counter 540 is then incremented a unit.

In conclusion, the electrical system depicted in FIG. 18 includes several interlocks which prevent operation of a unit in the event that either the drawer is opened, the housing is opened, or if the less than both keys are present in a module to be activated. In other words, the system cannot be operated unless both original and blank keys are inserted into a particular modules (or a total of four keys are inserted into both modules) and the unit is totally closed. Consequently, the likelihood of shavings and other debris leaving the housing, or the likelihood of an operator or other individual contacting the cutting wheels during operation is all but eliminated.

While the form of apparatus herein described constitutes a preferred embodiment of this invention, it is to be understood that the invention is not limited to this precise form of apparatus, and that changes may be made therein without departing from the scope of the invention.

What is claimed is:

1. A key duplicating machine comprising:

support means for receiving original and blank keys and holding said keys in relative alignment;

cutting means for engaging a notch pattern on said original key and cutting a corresponding notch pattern on said blank key;

motor driven cam means rotatably mounted on said cutting means; and stationary cam follower means positioned to engage said cam means such that rotation of said cam means causes said cutting means to move relative to said original and blank keys, whereby said cutting means cuts a notch pattern on said key blank corresponding to said notch pattern on said original key.

2. The key duplicating machine of claim 1 wherein rotation of said cam means causes said cutting means to reciprocate from a starting position along a cutting pass to an end travel position, then from said end travel position along a return pass back to said starting position.

3. The key duplicating machine of claim 2 wherein said cutting means includes a travel plate supporting said cam means; and means for following a notch pattern in said original key and cutting a corresponding notch pattern on said blank key, said following and cutting means being mounted on said travel plate for lateral displacement relative thereto, and relative to said keys.

4. The key duplicating machine of claim 3 further comprising means for biasing said following and cutting means laterally against said original and said blank keys; and second cam follower means, engaging said cam means, for displacing said following and cutting means sidewardly away from said keys as said cutting means travels along said return pass.

5. The key duplicating machine of claim 4 further comprising means for aligning said original and blank keys relative to each other; and third cam follower means, engaging said cam means, for displacing said aligning means from said original and blank keys prior to engagement of said keys by said cutter wheel and said key follower.

6. The key duplicating machine of claim 5 wherein said cam means comprises a first cam element for engaging said stationary cam follower; a second cam element for engaging said second cam follower means; and a third cam element for engaging said third cam follower means.

7. The key duplicating machine of claim 6 wherein said first, second and third cam elements are arranged in a vertically stacked relation.

8. The key duplicating machine of claim 7 wherein said third cam element is disc shaped and includes a plurality of arcuate slots for receiving said third cam follower means.

9. A key duplicating machine comprising:

stationary support means;

means, mounted for reciprocal motion relative to said support means, for following a notch pattern in an original key and for cutting a corresponding notch pattern in a blank key;

clamp block means for holding said original and blank keys in a predetermined orientation relative to each other and to said following and cutting means, said clamp block means including first and second spaced support surfaces positioned adjacent to said following and cutting means, first and second jaw means biased to clamp against said first and second support surfaces, respectively, and means for selectively displacing said jaw means away from said support surfaces, whereby activation of said displacing means by an operator displaces said jaw means away from said support surfaces, thereby facilitating insertion and removal of said keys from said clamp block means, and deactivation of said displacing means allows said jaws to engage and clamp said keys against said support surfaces.

10. The key duplicating machine of claim 9 wherein said first and second jaw means each includes a jaw element mounted on said clamp block means for slidable movement toward and away from an associated one of said support surfaces; and resilient means for urging said jaw element against said associated support surface when said displacing means is deactivated.

11. The key duplicating machine of claim 10 wherein said displacing means includes eccentric cam means rotatably mounted on said clamp block and engaging said jaw elements, whereby rotation of said cam means alternately displaces said jaw means away from said support surfaces and allows said jaw means to clamp against said support surfaces.

12. The key duplicating machine of claim 11 wherein said cam means includes first and second cam elements mounted for rotational engagement with said first and second jaw elements; first and second lever arms attached to said cam elements; and said resilient means includes first and second springs attached to said clamp block means to urge against said first and second jaw elements, respectively.

13. A key duplicating machine comprising:

stationary support means;

means, mounted for reciprocal motion relative to said support means, for following a notch pattern in an original key and for cutting a corresponding notch pattern in a blank key;

clamp block for holding said original and blank keys in a predetermined orientation relative to each other and to said following and cutting means;

means for clamping said keys during operation of said following and cutting means;

means for engaging and aligning said keys prior to activation of said clamping means, said engaging and aligning means including means for biasing said keys against said clamp block, said biasing means including first and second leaf spring means, a spring block supporting said leaf spring means and movable by said displacing means, and rail means, mounted on said clamp block, for supporting said spring block for slidable movement relative to said keys by said displacing means; and means for displacing said aligning means from engagement with said keys subsequent to activation of said clamping means, thereby providing clearance for said following and cutting means to operate.

14. The key duplicating machine of claim 13 further comprising means forming a stop to engage shoulders of said keys and thereby effect longitudinal alignment of said keys relative to said following and cutting means, said stop means being mounted on said spring block.

15. A key duplicating machine comprising:

support means for receiving original and blank keys and holding said keys in relative alignment;

laterally displaceable cutting means for engaging a notch pattern on said original key and cutting a corresponding notch pattern on said blank key;

means for moving said cutting means longitudinally relative to said keys along a cutting pass, whereby said cutting means traces and cuts a notch pattern along the blades of said original and blank keys, respectively; and means for displacing said cutting means laterally away from said keys as said cutting means is moved longitudinally along a return pass.

16. The key duplicating machine of claim 15 wherein said displacing means includes spacer block means mounted on said support means; and cam follower means mounted on said cutting means and positioned to engage said spacer block means on said return pass, whereby said cutting means is displaced laterally away from and does not contact said keys.

17. The key duplicating machine of claim 16 wherein said block means includes a longitudinally-extending channel; a wedge-shaped block; and means biasing said block forwardly and outwardly from said channel; whereby said cam follower means engages and displaces said block rearwardly into said channel during said cutting pass until said cam follower means engages said channel, whereupon said block is urged forwardly from said channel such that said cam follower means rides over an outer surface thereof during said return pass so that said cutting means is displaced from said keys on said return pass.

18. In a key duplicating machine of a type having means for clamping original and blank keys; means for following a notch pattern on said original key and cutting a notch pattern on said blank key; a drawer for receiving and holding chips from said blank key; means for supplying electrical power to said following and cutting means; and a housing enclosing said clamping means, said following and cutting means and said drawer; a safety interlock comprising:

means for detecting a presence of said original key in said clamping means;

means for detecting a presence of said blank key in said clamping means;

means for detecting a closed state of said housing;

circuit means for interrupting a flow of electrical current to said following and cutting means from said power supply means unless said original and blank keys are positioned in said clamping means and said housing is in a closed state.

19. The interlock of claim 18 wherein said circuit means interrupts a flow of power to said following and cutting means unless said drawer is in a closed state.

20. A method of duplicating keys comprising the steps of:

receiving original and blank keys and holding said keys in relative alignment;

moving cutter block means from a start position along a cutting pass to engage a notch pattern on said original key and cut a corresponding notch pattern on said blank key;

displacing said cutter block means sidewardly away from contacting said original and blank keys subsequent to said cutting pass;

moving said cutter block means along a return pass back to said start position while said cutter block is not contacting said keys, 21. The method of claim 20 wherein said receiving step includes the step of urging said keys against gauge support surfaces in an aligned configuration; and subsequently clamping said keys in said configuration.

22. The method of claim 21 wherein said urging step includes the step of positioning a spring block adjacent to said keys; and subsequently moving said spring block away from said keys during said cutter block means moving step to provide clearance for engagement of said keys by said cutter block means.

23. For use in a key duplicating machine of a type having means for clamping original and blank keys; means for following a notch pattern on said original key and cutting a notch pattern on said blank key; a drawer for receiving and holding chips from said blank key; means for supplying electrical power to said following and cutting means; and a housing enclosing said clamping means, said following and cutting means and said drawer; a safety interlock method comprising:

detecting a presence of said original key in said clamping means;

detecting a presence of said blank key in said clamping means;

detecting a presence of a closed state of said housing; and interrupting a flow of electrical current to said following and cutting means from said power supply means unless said original and blank keys are positioned in said clamping means and said housing is in a closed state.

24. The method of claim 23 further comprising the step of interrupting a flow of power to said following and cutting means unless said drawer is in a closed state.

25. A method for operating a key duplicating machine of a type having stationary support means and means, mounted for reciprocal motion relative to said support means, for following a notch pattern in an original key and for cutting a corresponding notch pattern in a blank key, comprising the steps of:

holding said original and blank keys in a predetermined orientation relative to each other and to said following and cutting means;

clamping said keys during engagement with said following and cutting means, said clamping step including releasing spring biased jaw means to engage said keys, whereby said keys are retained in orientation by clamping pressure of said jaw means generated entirely by spring force.

* * * * *